(12) United States Patent
Usui et al.

(10) Patent No.: US 6,230,891 B1
(45) Date of Patent: May 15, 2001

(54) CONTAINER AND SUPPORTING MEMBER FOR MEMORY DISKS

(75) Inventors: Kazuo Usui, Tokyo; Shigeru Sekihara, Saitama; Mitsuhiro Kikuchi, Saitama; Takahide Abiko, Saitama, all of (JP)

(73) Assignee: Sakurai Co., Ltd., Tokyo (JP)

( * ) Notice: Subject to any disclaimer, the term of this patent is extended or adjusted under 35 U.S.C. 154(b) by 0 days.

(21) Appl. No.: 09/333,298

(22) Filed: Jun. 15, 1999

(30) Foreign Application Priority Data

Jun. 22, 1998 (JP) .................................................. 10-174542
Apr. 15, 1999 (JP) .................................................. 11-108451

(51) Int. Cl.$^7$ .................................................. B65D 85/48
(52) U.S. Cl. .................. 206/454; 206/710; 206/493; 206/509; 206/303; 211/41.18
(58) Field of Search ..................... 206/454, 449, 206/832, 710, 711, 712, 308.1, 309, 493, 511, 509, 583; 211/41.18

(56) References Cited

U.S. PATENT DOCUMENTS

| | | | | |
|---|---|---|---|---|
| 2,476,996 | * | 7/1949 | Nebel | 242/71 |
| 3,384,228 | * | 5/1968 | Cannon | 206/389 |
| 4,027,794 | * | 6/1977 | Olson | 206/583 |
| 4,516,678 | | 5/1985 | Fotiadis et al. . | |
| 4,747,488 | * | 5/1988 | Kikuchi | 206/454 |
| 4,752,007 | * | 6/1988 | Rossi et al. | 206/454 |
| 4,793,488 | * | 12/1988 | Mortensen | 206/454 |
| 4,903,827 | * | 2/1990 | Phelps et al. | 206/583 |
| 4,955,471 | | 9/1990 | Hirose et al. . | |
| 5,094,346 | | 3/1992 | Sommerfeldt et al. . | |
| 5,100,076 | | 3/1992 | Cobane et al. . | |
| 5,165,542 | | 11/1992 | Sommerfeldt et al. . | |
| 5,265,725 | * | 11/1993 | Judd et al. | 206/387 |
| 5,501,325 | * | 3/1996 | Mehltretter | 206/303 |
| 5,542,531 | * | 8/1996 | Yeung | 206/308.1 |
| 5,655,660 | * | 8/1997 | Dolin et al. | 206/538 |
| 5,669,494 | * | 9/1997 | Geffen | 206/308.1 |
| 5,725,101 | * | 3/1998 | Kakizaki et al. | 206/711 |
| 5,850,921 | * | 12/1998 | Shindou et al. | 206/711 |

FOREIGN PATENT DOCUMENTS 0 648 684   4/1995   (EP) .

OTHER PUBLICATIONS

European Search Report and Annex.

* cited by examiner

*Primary Examiner*—Paul T. Sewell
*Assistant Examiner*—Shian Luong
(74) *Attorney, Agent, or Firm*—Lowe Hauptman Gilman & Berner, LLP.

(57) ABSTRACT

A container for memory disks comprising an upper case; a bottom case; and a supporting member which is adapted to be held between the upper case and the bottom case and to be inserted into each central hole of the memory disks so as to retain the memory disks, thus rendering the outer peripheral portions of the memory disks to become free in the container.

5 Claims, 22 Drawing Sheets

CONTAINER AND SUPPORTING MEMBER FOR MEMORY DISKS

BACKGROUND OF THE INVENTION

The present invention relates to a container and supporting member for memory disks, and in particular to a container and supporting member for memory disks, which are designed to securely retaining memory disks therein even on the occasion of transporting the memory disks provided with a central hole.

According to the conventional container for memory disks which is designed to retain or transport the memory disks, each memory disk is generally retained therein by allowing its outer circumferential portion to be held in place in the container consisting of an upper case and a bottom case.

For example, as seen from FIGS. 29 and 30, the aforementioned conventional container 9 is comprised of an upper case 7 and a bottom case 8, wherein a memory disk 2 is placed in the bottom case 8 at first and then the bottom case 8 is covered by the upper case 7 so as to retain the memory disk. FIG. 29 shows a state where the upper case 7 of the container 9 is separated from the bottom case 8. This upper case 7 is constructed such that it comprises an L-shaped rim 72, a pair of recessed portions 71 formed along the inner circumference of the rim 72, and a pair of tongues 73 suspended down from the opposite end portions of the rim 72.

The tongue 73 is formed of a brim portion 732 having a flat surface, and an inwardly projected central portion 731 surrounded by the brim portion 732. Each of the tongues 73 is tapered toward the distal end thereof. On the other hand, the bottom case 8 is provided near the upper edge thereof with a rim 82 surrounding the opening of the bottom case 8. Further, the bottom case 8 is provided on both sidewalls 84 thereof with U-shaped cut-off portions 83, and on the inner wall thereof with a large number of grooves 81 for allowing a large number of memory disks to be inserted and retained therein.

FIG. 30 illustrates a state of the container 9 wherein the memory disks 2 are retained therein by means of the upper case 7 and the bottom case 8 which are shown in FIG. 29. In this case, the memory disks 2 can be retained therein as follows. Namely, after a desired number of memory disks 2 are introduced into the bottom case 8, the upper case 7 is placed over the bottom case 8 in such a manner that the tongues 73 of the upper case 7 are respectively fitted in the U-shaped cut-off portions 83 of the bottom case 8, thereby allowing the rim 72 to be engaged with the rim 82. As a result, the upper case 7 is integrally coupled with the bottom case 8, and at the same time, the outer peripheral portions of memory disks 2 are pressed down by the inner wall of the recessed portions 71 of the upper case 7, thereby keeping the memory disks 2 retained in the grooves 81 of the bottom case 8.

However, since the memory disks are retained in the container with the outer peripheral portions thereof being held under pressure between the inner surface of the upper case and the grooves of the bottom case in the aforementioned memory disk container, the outer peripheral portions of the memory disks are likely to be abraded due to the vibration and shock during the transportation of the container, thereby generating fine dust and hence giving a damage to the outer peripheral portions of the memory disks. Additionally, there is also a problem that when the upper case is disengaged from the bottom case, the outer peripheral surfaces of the memory disks are inadvertently caused to contact with the upper case.

SUMMARY OF THE INVENTION

An object of the present invention is to provide a container for memory disks, which enables the memory disks to be retained in the container consisting of an upper case and a bottom case without giving a damage to the outer peripheral surface of the memory disks.

To realize the aforementioned objects, the present invention provides a container for memory disks, which comprises; an upper case; a bottom case; and a supporting member which is adapted to be held between the upper case and bottom case and to be inserted into each central hole of the memory disks so as to retain the memory disks, thus rendering the outer peripheral portions thereof free in said container.

According to a preferable embodiment of the container for memory disks of the present invention, the upper case is provided at the top portion thereof with a raised flat portion, and the bottom case is provided with a raised flat bottom surface.

According to another preferable embodiment of the container for memory disks of the present invention, these upper and bottom cases are coupled through a hinge mechanism, whereby these cases are rotatable relative to each other.

According to another preferable embodiment of the container for memory disks of the present invention, the upper case is provided with a pressing surface for pressing the supporting member, while the bottom case is provided with a recessed portion for allowing the supporting member to be fitted therein, whereby the supporting member is retained between the recessed portion and the pressing surface.

The supporting member for the memory disks that can be employed in a memory disk container according to the present invention comprises a pair of wide short strips each having notched sides for retaining the memory disks, and a pair of narrow long strips each having a notched side for retaining the memory disks, these short strips and long strips being interconnected with each other through their sides, thereby forming a collapsible loop, wherein the pair of narrow long strips are enabled to be folded into a space between the pair of wide short strips and are made engageable with each other through the sides opposite the notched sides.

According to still another preferable embodiment of a supporting member for the memory disks that can be employed in a memory disk container according to the present invention, a pair of strips each having notched sides for retaining the memory disks are collapsibly hinged to each other through a spring, thereby enabling the opening degree of the pair of strips to be reduced by pressing the strips to each other against the urging force of the spring.

According to a further preferable embodiment of supporting member for the memory disks that can be employed in a memory disk container according to the present invention, there is provided a sheet, and a pair of rods attached to the opposite sides of the sheet. The sheet is provided with elongated grooves extending in a direction orthogonal to the longitudinal direction of the rods, and the sheet is enabled to be wound around the rods by the rotation of the rods.

The container for memory disks as well as the supporting member for memory disks which are constructed as mentioned above according to the present invention are designed such that the memory disks are retained through the central hole formed in each memory disk, while keeping the supporting member held between the upper case and the bottom case, so that the peripheral portions of the memory disks can be left free, thus making it possible to prevent the peripheral portions or memory portions of the memory disks from being damaged through the contact thereof with the container. Therefore, the container for memory disks as well as the supporting member for memory disks according to the present invention are very suited for use in handling and transporting the memory disks.

DETAILED DESCRIPTION OF THE INVENTION

Next, one embodiment of the present invention wherein a container for memory disks which is formed of a transparent plastic material will be explained in details with reference to the drawings.

Figure 1:
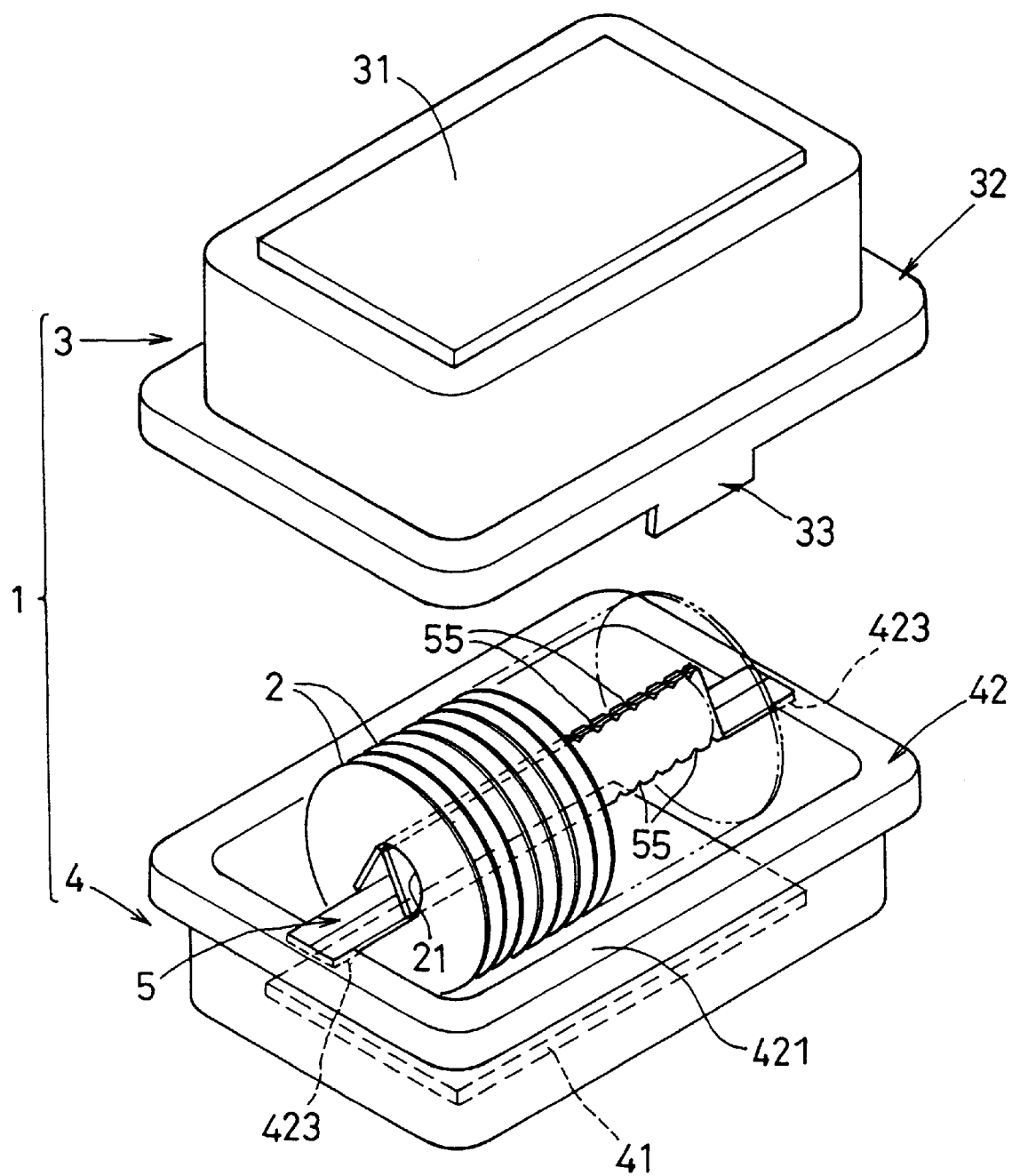
FIG. 1 is a perspective view of a container for memory disks according to a first embodiment of the present invention wherein an upper case and a bottom case are separated from each other.

FIG. 1 illustrates a first embodiment of the container for memory disks (or the memory disk container), or a perspective view of the memory disk container 1 wherein an upper case 3 and a bottom case 4 are separated from each other. This transparent upper case 3 is provided at the top surface thereof with a raised flat portion 31, and at the lower portion thereof with an L-shaped rim 32 having a pair of engaging portions 33 each extending downward from the central portion of opposite longer sides of the upper case. The transparent plastic bottom case 4 is provided at the central bottom portion thereof with a raised flat bottom surface 41, and at the upper edge portion thereof with an L-shaped rim 42 having a pair of recessed portions 423 each formed at the center of top surface 421 of the opposite shorter sides. Opposite end portions of a plastic supporting member 5 are placed on the recessed portions 423 of the L-shaped rim so as to be supported by the L-shaped rim 42. This supporting member 5 is designed to be introduced into the central holes 21 of a large number of memory disks 2 so as to retain the memory disks 2 by fitting each memory disk 2 in each of the notched (cut-out) portions 55 formed on the sides of this supporting member 5.

Figure 2:
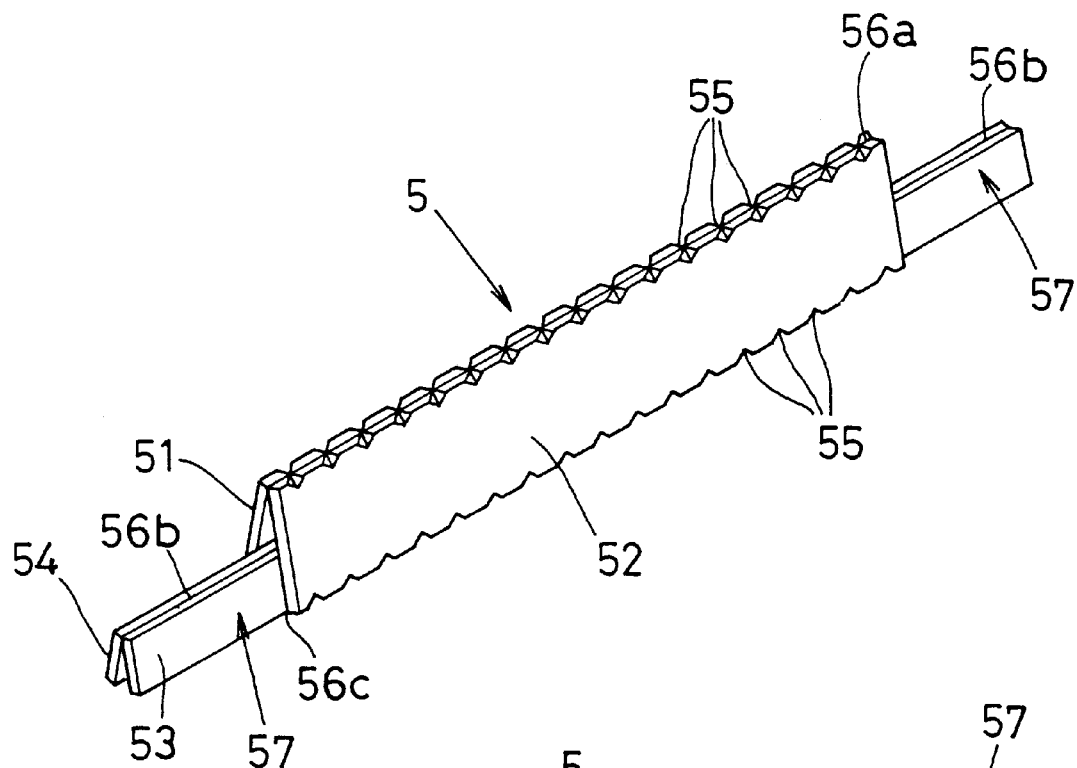
FIG. 2 is a perspective view illustrating a state wherein the supporting member shown in FIG. 1 is collapsed.
Figure 3:
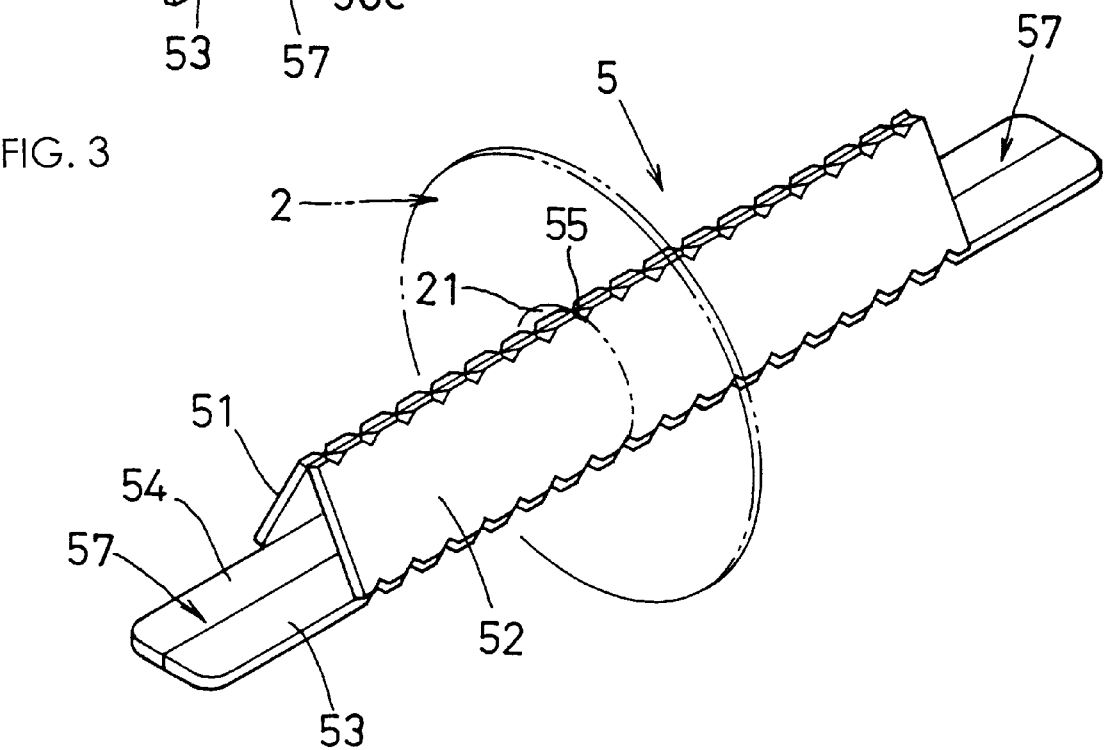
FIG. 3 is a perspective view illustrating a state wherein a memory disk is axially supported by the supporting member shown in FIG. 1.

FIGS. 2 and 3 illustrate in detail a perspective view of the structure of the plastic supporting member 5 shown in FIG. 1. Specifically, FIG. 2 shows a state wherein the supporting member 5 is collapsed prior to use, while FIG. 3 shows a state wherein the memory disk 2 is axially supported by the supporting member 5 during use.

To illustrate in detail the structure of the supporting member 5 by referring to FIG. 2, the supporting member 5 comprises a pair of wide short strips 51 and 52, each provided at opposite side edge portions of one main surface thereof with a plurality of notches 55 for retaining the memory disks 2, and a pair of narrow long strips 53 and 54, each provided at one side edge portion of one main surface thereof with a plurality of notches 55 for retaining the memory disks 2. The short strips 51 and 52 are interconnected with each other through a bendable interconnecting portion 56a formed therebetween. The narrow long strips 53 and 54 are also interconnected with each other through a bendable interconnecting portion 56b formed therebetween. The short strip 51 and the narrow long strip 54 are interconnected with each other through a bendable interconnecting portion 56c formed between the side edge of the short strip 51 located opposite to the interconnecting portion 56a and the side edge of the long strip 54 located opposite to the interconnecting portion 56b. Likewise, the short strip 52 and the narrow long strip 53 are interconnected with each other through a bendable interconnecting portion 56c formed between the side edge of the short strip 52 located opposite to the interconnecting portion 56a and the side edge of the long strip 53 located opposite to the interconnecting portion 56b. As a result, a loop is constituted by these short strips 51 and 52 and long strips 53 and 54. In the formation of this loop, the short strips 51 and 52 are positioned at the central portion in longitudinal direction of the long strips 53 and 54 thereby rendering the opposite ends of the long strips 53 and 54 to become protruded portions 57.

The supporting member 5 formed of an interconnecting structure as mentioned above is made collapsible in such a manner that the interconnecting portion 56b between a pair of narrow long strips 53 and 54 can be bent and folded in the direction of interconnecting portion 56a between the pair of wide short strips 51 and 52. Therefore, the total width of the supporting member 5 in a folded state is smaller than the inner diameter of the central hole 21 of the memory disk 2, thus making it possible to easily introduce the supporting member 5 into the central hole 21 of the memory disk 2 by collapsing these short strips 51 and 52 and long strips 53 and 54.

It is also possible to interconnect these strips with each other by making use of an adhesive tape or an adhesive agent, or by making use of a thin molded portion formed between these strips molded using a plastic material.

FIG. 3 shows a state wherein the folded supporting member 5 shown in FIG. 2 is applied to support the memory disk 2. Namely, this supporting member 5 is introduced in a folded state into the central hole 21 of the memory disk 2 so as to permit each memory disk 2 to align with each notch 55. Thereafter, the folded long strips 53 and 54 are flattened to thereby expand the short strips 51 and 52 and cause the long strips 53 and 54 to constitute one side of the triangular cross-section. As a result, the notches 55 are permitted to move from the central hole 21 of the memory disks 2 toward the outer periphery of the memory disk 2, and to engage with the peripheral portion of the central hole 21, thus making it possible to securely retain the memory disks 2.

Figure 4:
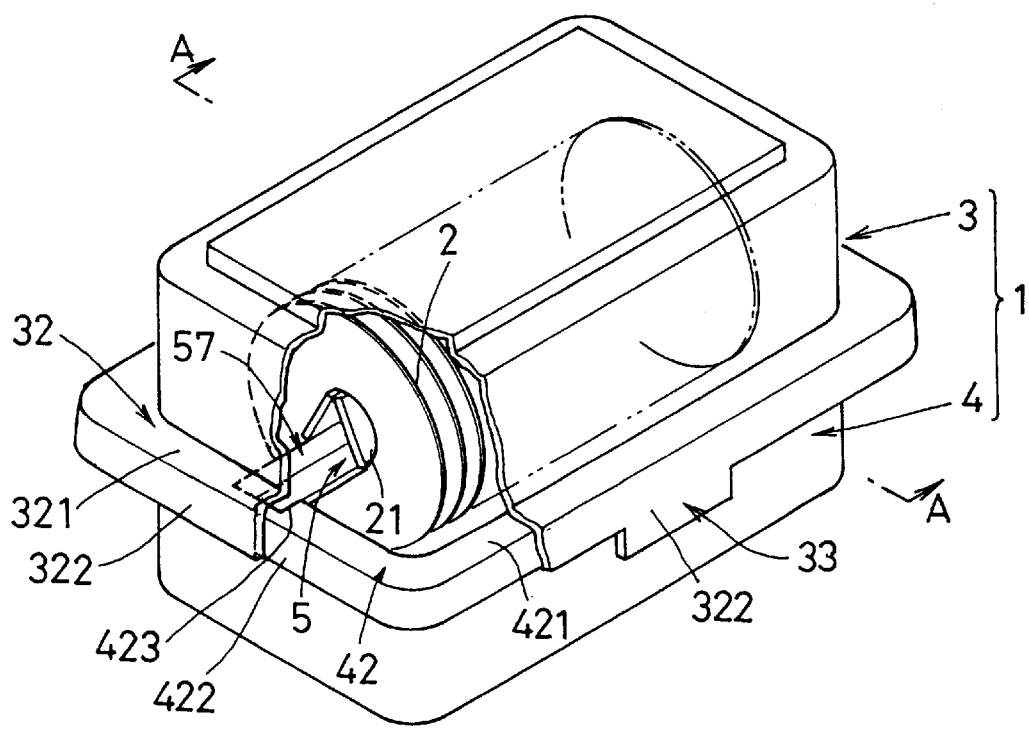
FIG. 4 is a perspective view illustrating a state wherein memory disks are retained in the container of FIG. 1 by making use of the supporting member shown in FIGS. 2 and 3.

FIG. 4 shows a perspective view illustrating a state wherein memory disks 2 are retained in the container 1 of FIG. 1 by making use of the supporting member 5 shown in FIGS. 2 and 3.

At first, the supporting member 5 is assembled such that the short and long strips thereof are expanded to take a triangular cross-sectional shape thereby securely retaining the memory disks 2. Then, the opposite protruded portions 57 of the supporting member 5 are fitted in the recessed portions 423 formed on the top surface 421 of the L-shaped rim 42 of the bottom case 4, whereby the supporting member 5 is set in place in the bottom case 4 while the outer peripheries of the memory disks 2 are kept prevented from being contacted with the inner surface of the bottom case 4.

Then, the bottom case 4 is closed with the upper case 3, thereby permitting the suspended portion 422 of the L-shaped rim 42 of the bottom case 4 to be engaged with the engaging portions 33 of the suspended portion 322 of the L-shaped rim 32 of the upper case 3. As a result, the L-shaped rim 42 of the bottom case 4 is closely contacted with the L-shaped rim 32 of the upper case 3, thereby tightly packing the memory disks 2 while preventing the outer peripheries of the memory disks 2 from being contacted with the inner surface of the upper case 3.

Due to the effect of this tight closing between the bottom case 4 and the upper case 3, the pressing force by the pressing surface 321 of the L-shaped rim 32 of the upper case 32 is acted on both protruded portions 57 of the supporting member 5, thereby preventing both protruded portions 57 from being dismounted from the recessed portions 423 of the L-shaped rim 42 of the bottom case 4. Thus, both protruded portions 57 of the supporting member 5 can be stably kept fitted in the recessed portions 423 of the L-shaped rim 42.

Figure 5:
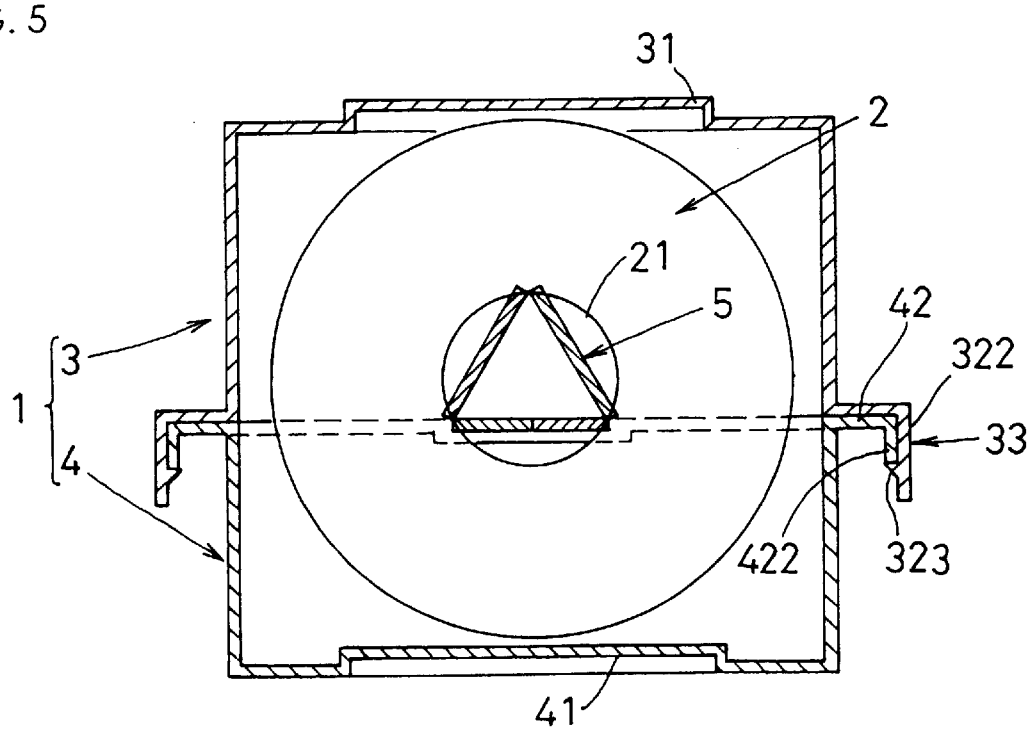
FIG. 5 is a cross-sectional view of a container consisting of an upper case and a bottom case, which is taken along the line A—A of FIG. 4.

FIG. 5 illustrates a cross-sectional view of the container shown in FIG. 4 and consisting of the upper case 3 and the bottom case 4, as viewed along the line A—A of FIG. 4. Namely, FIG. 5 illustrates a state of the memory disks as they are being mounted in the container 1. An engaging projection 323 is formed at each of the engaging portions 33 of the suspended portion 322 of the L-shaped rim 32 of the upper case 3. The upper case 3 and the bottom case 4 of the container 1 are coupled with each other in a tightly sealed condition through an engagement between the suspended portions 422 of the L-shaped rim 42 of the bottom case 4 and the engaging projections 323 of the engaging portions 33. Further, the raised flat portion 31 is formed on the top portion of the upper case 3, and the raised flat bottom surface 41 is formed on the bottom of the bottom case 4, so that a plurality of the containers 1 can be piled up one after another while the outer peripheries of the memory disks 2 supported axially through the central holes 21 thereof by the supporting member 5 are prevented from being contacted with the inner surfaces of the upper and bottom cases 3 and 4.

Figure 6:
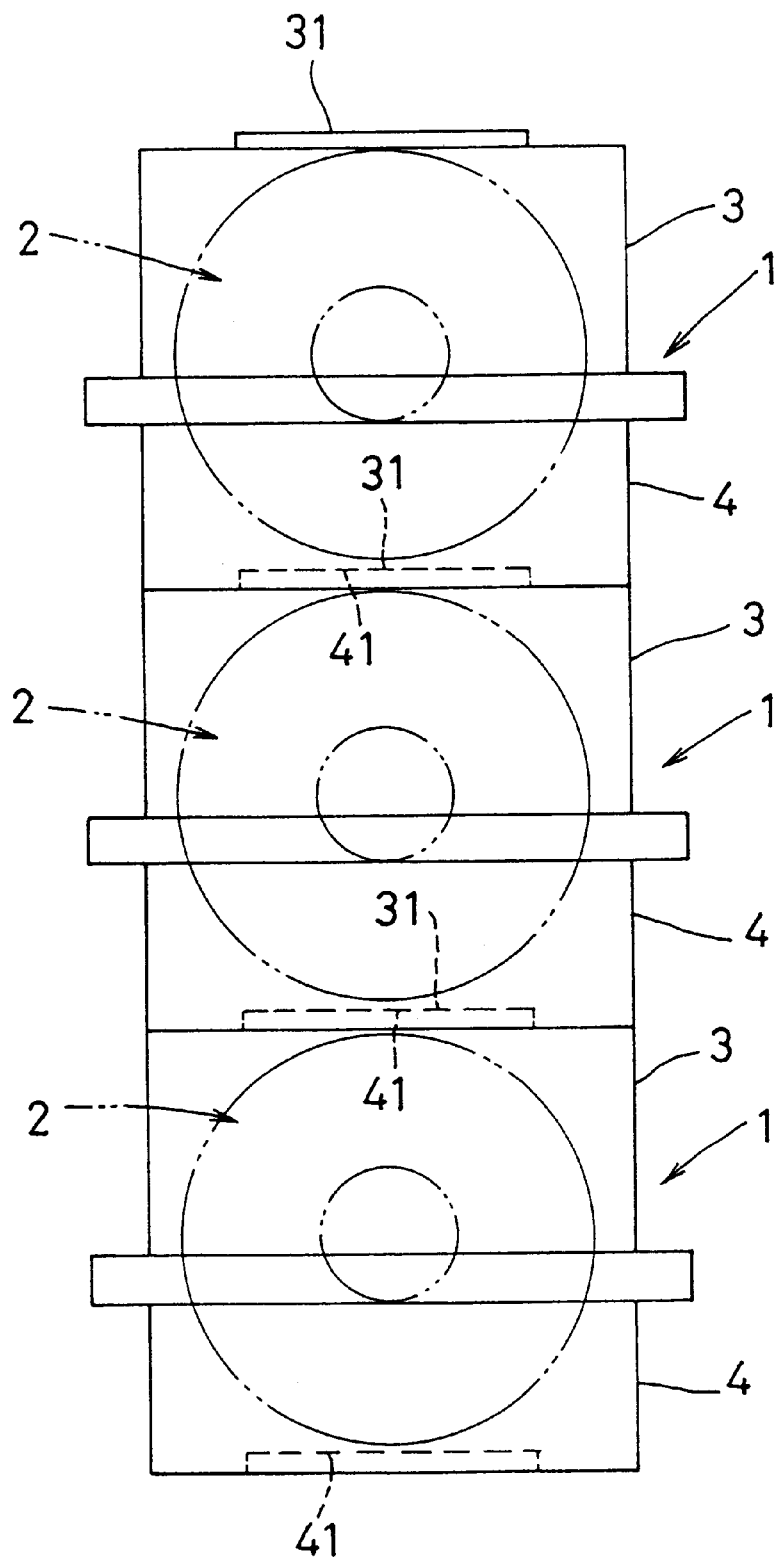
FIG. 6 is a side view illustrating a state wherein the container shown in FIG. 5 is piled up one upon another.

FIG. 6 shows a side view illustrating a state wherein a plurality of the containers 1 are piled up one upon another for the convenience of transportation and arrangement. Namely, when one container 1 housing the memory disks 2 therein is piled upon another container 1 as shown in FIG. 6, the raised flat portion 31 formed on the upper case 3 of one container 1 is allowed to engage with the raised flat bottom surface 41 of another container 1 in nested relationship. Therefore, it is possible, through this engagement, to maintain the piled-up state of the containers 1 even if these containers 1 are subjected to a rocking or vibration during the transportation thereof. Moreover, since the memory disks 2 are securely kept retained in the container 1, the memory disks 1 can be prevented from being damaged.

A second embodiment of the memory disk container according to the present invention will now be explained.

Figure 7:
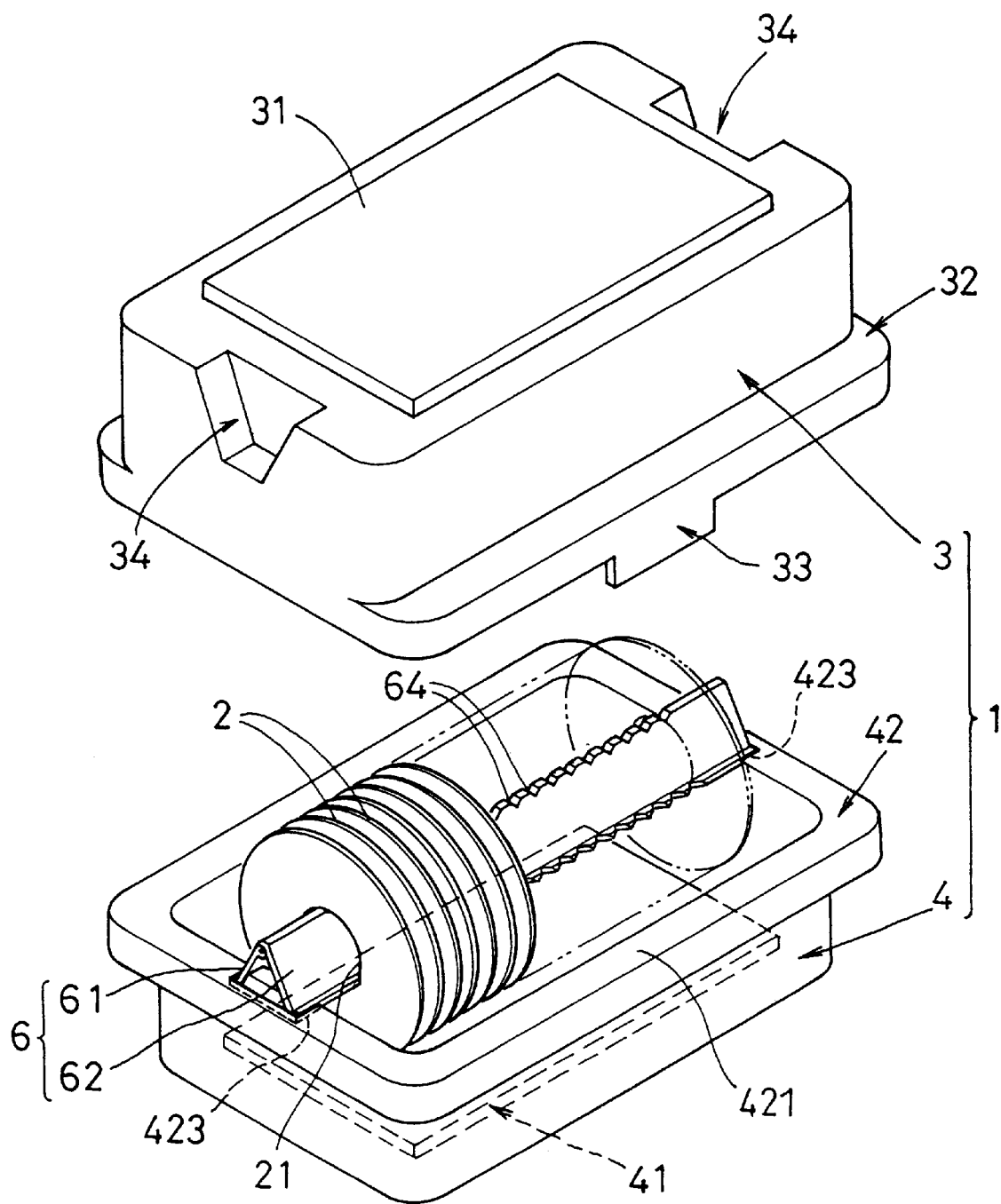
FIG. 7 is a perspective view of a container for memory disks according to a second embodiment of the present invention wherein an upper case and a bottom case are separated from each other.

FIG. 7 illustrates a perspective view of the memory disk container 1 wherein the upper case 3 and the bottom case 4 according to this embodiment are separated from each other. This container 1 is constructed in almost the same manner as the container illustrated in FIGS. 1 to 5. Namely, this transparent upper case 3 is provided at the top surface thereof with the raised flat portion 31, and at the lower portion thereof with the L-shaped rim 32 having a pair of engaging portions 33 each extended downward from the central portion of opposite longer sides of the upper case 3. On the other hand, the transparent plastic bottom case 4 is provided at the central bottom portion thereof with a raised flat bottom surface 41, and at the upper edge portion thereof with an L-shaped rim 42 having a pair of recessed portions 423 each formed at the center of top surface 421 of the opposite shorter sides. The opposite end portions of a plastic supporting member 6 is placed on the recessed portions 423 of the L-shaped rim 42 so as to be supported by the L-shaped rim 42. This supporting member 6 is designed to be introduced into the central holes 21 of a large number of memory disks 2 so as to retain the memory disks 2 by fitting each memory disk 2 in each of the notched portions 64 formed on the sides of this supporting member 6.

However, this embodiment is featured in that a couple of recessed pressing portions 34 are formed at the opposite shorter sides of the upper case 3 of the container shown in FIGS. 1 to 5, and in that the supporting member 6 is constituted by a couple of long strips 61 and 62 of the same length.

Figure 8:
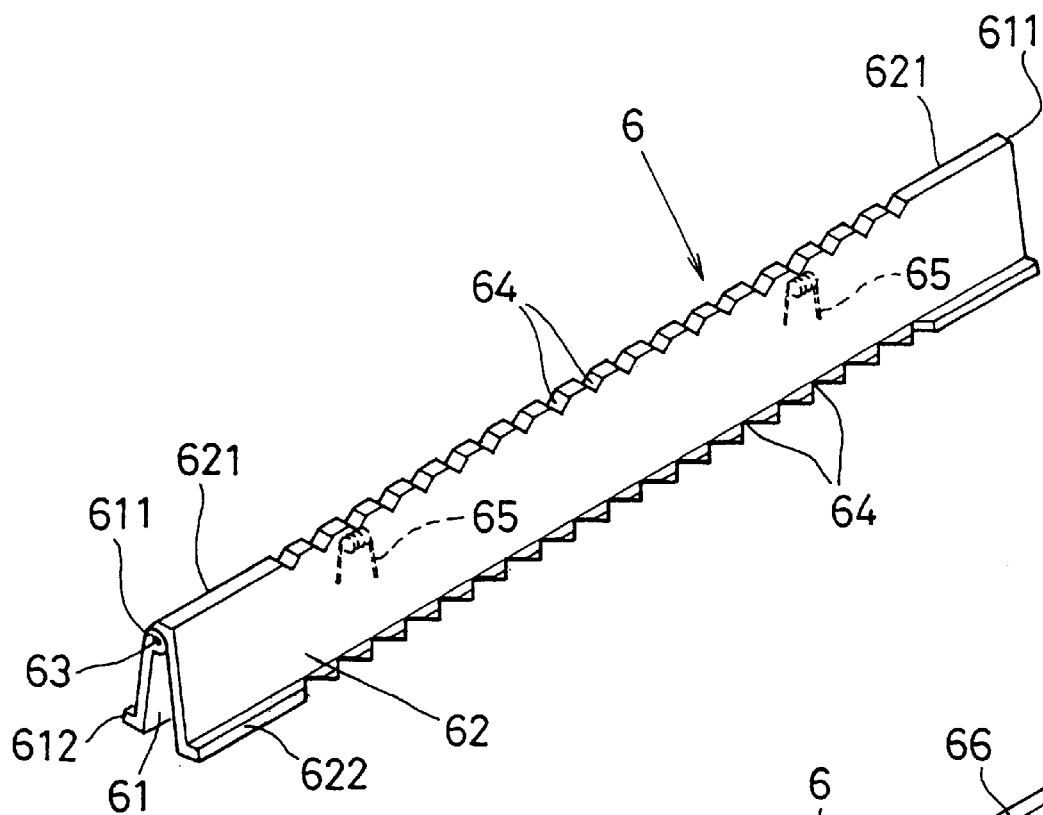
FIG. 8 is a perspective view illustrating a state wherein the supporting member shown in FIG. 7 is compressed.
Figure 9:
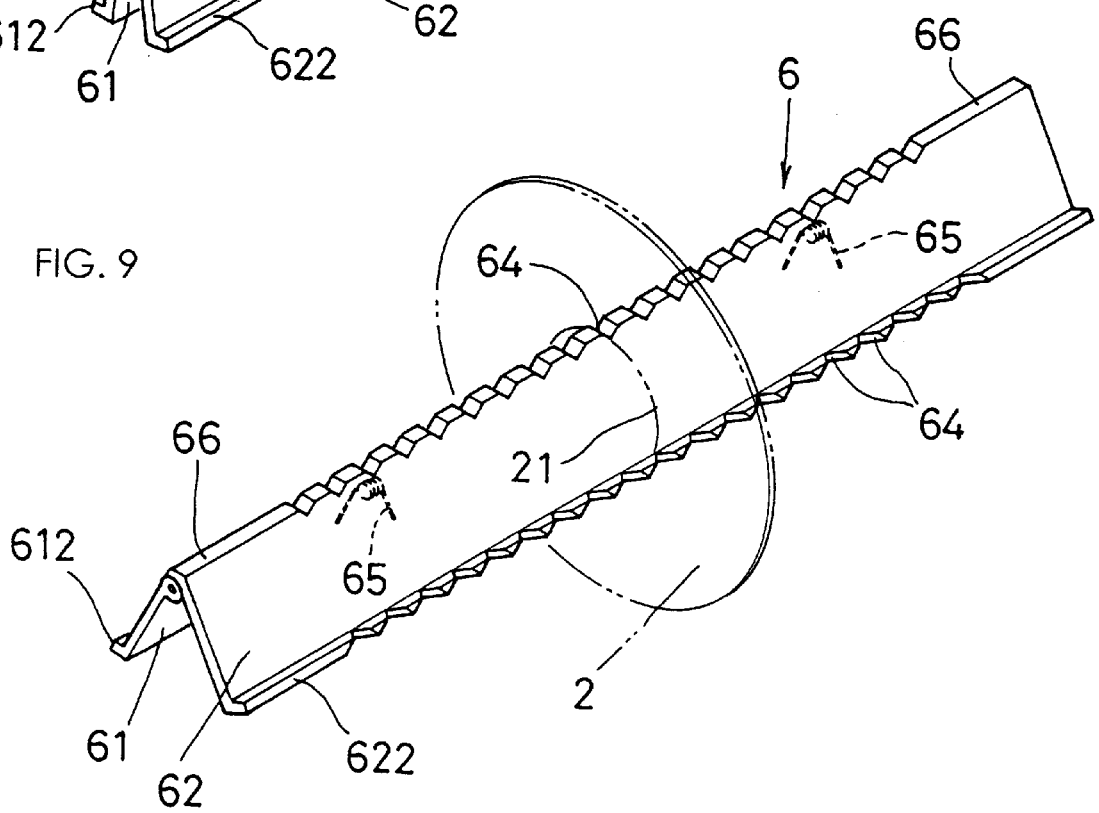
FIG. 9 is a perspective view illustrating a state wherein the supporting member shown in FIG. 7 is employed.

FIGS. 8 and 9 illustrate in details a perspective view of the structure of the plastic supporting member 6 shown in FIG. 7. Specifically, FIG. 8 shows a state wherein the supporting member 6 is compressed at the occasion of inserting it into the memory disks 2, while FIG. 9 shows a state wherein the memory disk 2 is axially supported by the supporting member 6 during the use thereof.

To illustrate in detail the structure of the supporting member 6 by referring to FIG. 8, the supporting member 6 comprises a pair of elongated strips 61 and 62, each constructed such that the opposite longitudinal sides thereof are bent in the opposite lateral direction from each other thereby forming upper laterally extended portions 611 and 621 for constituting a hinge, and lower externally extended portions 612 and 622, and that notches 64 for retaining a plurality of memory disks are formed at the central region (in longitudinal direction) of these extended portions 611, 612, 621 and 622. The elongated strips 61 and 62 are interconnected with each other through a hinge mechanism which is realized by inserting an axial rod 63 into the upper laterally extended portions 611 and 621 with springs 65 being interposed therebetween.

The supporting member 6 formed of an interconnecting structure as mentioned above is made collapsible in such a manner that the opening angle thereof can be minimized by compressing the strips 61 and 62 toward each other against the urging force of the spring 65, thus making it possible to easily introduce the supporting member 6 into the central hole 21 of the memory disk 2 as in the case of the container shown in FIGS. 1 to 5.

FIG. 9 shows a state wherein the compressed supporting member 6 shown in FIG. 8 is applied to support the memory disk 2. Namely, this supporting member 6 is introduced in a compressed state into the central hole 21 of the memory disk 2 so as to permit each memory disk 2 to align with each notch 64. Thereafter, the compressed elongated strips 61 and 62 are released from the compression thereby to allow the elongated strips 61 and 62 to expand. As a result, due to the urging force of the springs 65, the lower externally extended portions 612 and 622 are moved externally, and the notches 64 are permitted to move from the central hole 21 of the memory disks 2 toward the outer periphery of the memory disk 2, and to engage with the peripheral portion of the central hole 21, thus making it possible to automatically and securely retain the memory disks 2.

Figure 10:
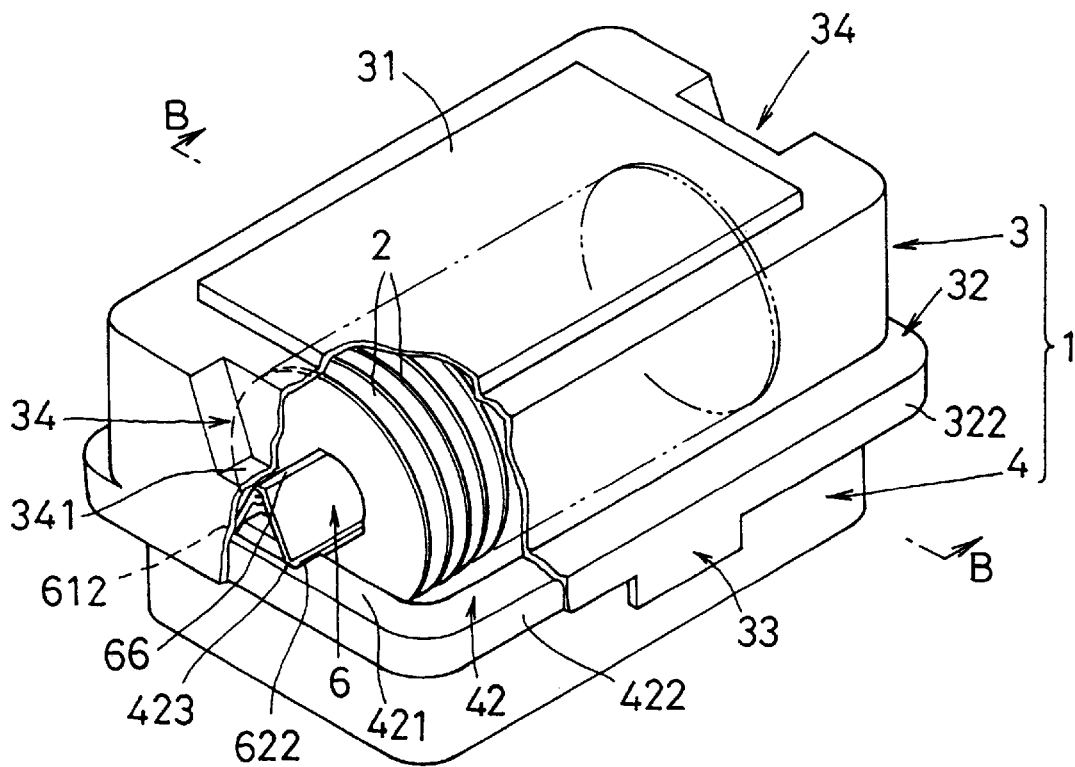
FIG. 10 is a perspective view illustrating a state wherein memory disks are retained in the container of FIG. 7 by making use of the supporting member shown in FIGS. 8 and 9.

FIG. 10 shows a perspective view illustrating a state wherein memory disks 2 are retained in the container 1 of FIG. 7 by making use of the supporting member 6 shown in FIGS. 8 and 9.

At first, the supporting member 6 is assembled such that the elongated strips thereof are expanded to thereby automatically retain the memory disks 2. Then, the lower externally extended portions 612 and 622 of the supporting member 6 are fitted in the recessed portions 423 formed on the top flat surface 421 of the L-shaped rim 42 of the bottom case 4, whereby the supporting member 6 is set in place in the bottom case 4 while the outer peripheries of the memory disks 2 are prevented from being contacted with the inner surface of the bottom case 4.

Then, the bottom case 4 is closed with the upper case 3, thereby permitting the suspended portion 422 of the L-shaped rim 42 of the bottom case 4 to be engaged with the engaging portions 33 of the suspended portion 322 of the L-shaped rim 32 of the upper case 3. As a result, the L-shaped rim 42 of the bottom case 4 is closely contacted with the L-shaped rim 32 of the upper case 3, and at the same time, a couple of the inner pressing surfaces 341 of the recessed pressing portions 34 formed on the sides of the upper case 3 are acted to press the opposite end portions 66 of the supporting member 6, thereby tightly packing the memory disks 2 while preventing the outer peripheries of the memory disks 2 from being contacted with the inner surface of the upper case 3.

Due to the effect of this tight closing between the bottom case 4 and the upper case 3, the pressing force by the inner pressing surfaces 341 of the recessed pressing portions 34 of the upper case 32 is acted to prevent the lower externally extended portions 612 and 622 of the supporting member 6 from being dismounted from the recessed portions 423 of the L-shaped rim 42 of the bottom case 4. Thus, the lower externally extended portions 612 and 622 of the supporting member 6 can be kept stably fitted in the recessed portions 423 of the L-shaped rim 42.

Figure 11:
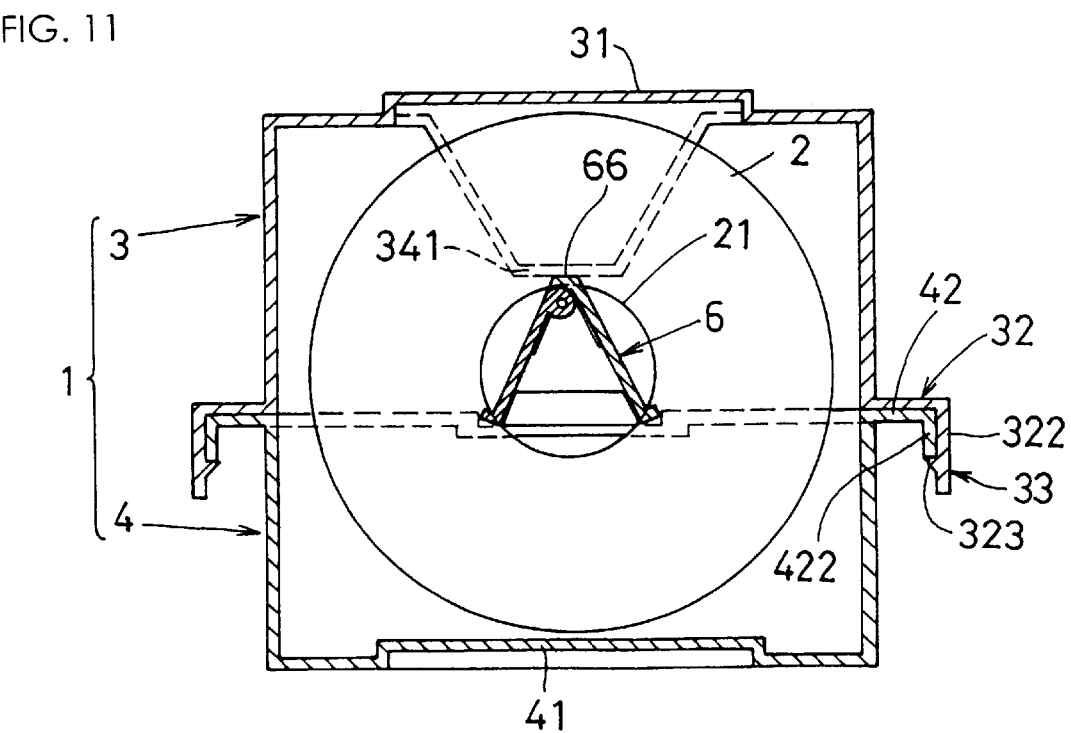
FIG. 11 is a cross-sectional view of a container consisting of an upper case and a bottom case, which is taken along the line B—B of FIG. 10.

FIG. 11 illustrates a cross-sectional view of the container shown in FIG. 10 and consisting of the upper case 3 and the bottom case 4, as viewed along the line B—B of FIG. 10. Namely, FIG. 5 illustrates a state of the memory disks as they are being mounted in the container 1. An engaging projection (hook) 323 is formed at each of the engaging portions 33 of the suspended portion 322 of the L-shaped rim 32 of the upper case 3. The upper case 3 and the bottom case 4 of the container 1 are coupled with each other in a tightly sealed condition through an engagement between the suspended portions 422 of the L-shaped rim 42 of the bottom case 4 and the engaging projections 323 of the engaging portions 33. Further, the raised flat portion 31 is formed on the top portion of the upper case 3, and the raised flat bottom surface 41 is formed on the bottom of the bottom case 4, so that a plurality of the containers 1 can be piled up one after another while the outer peripheries of the memory disks 2 supported axially by the supporting member 6 are prevented from being contacted with the inner surfaces of the upper and bottom cases 3 and 4.

Although not shown in the drawings, a plurality of the container 1 can be piled up one upon another for the convenience of transportation and arrangement. Namely, at the occasion of piling up a plurality of containers 1, the raised flat portion 31 formed on the upper case 3 of one container 1 is allowed to engage with the raised flat bottom surface 41 of another container 1. Therefore, it is possible, through this engagement, to maintain the piled-up state of the containers 1 even if these containers 1 are subjected to a rocking or vibration during the transportation thereof. Moreover, since the memory disks 2 are securely kept retained in the container 1, the memory disks 1 can be prevented from being damaged as illustrated with reference to FIGS. 1 to 5.

While in the foregoing one embodiment of the present invention has been explained in detail for the purpose of illustration, it will be understood that the construction of the device can be varied without departing from the spirit and scope of the invention as claimed in the following claims.

Figure 12:
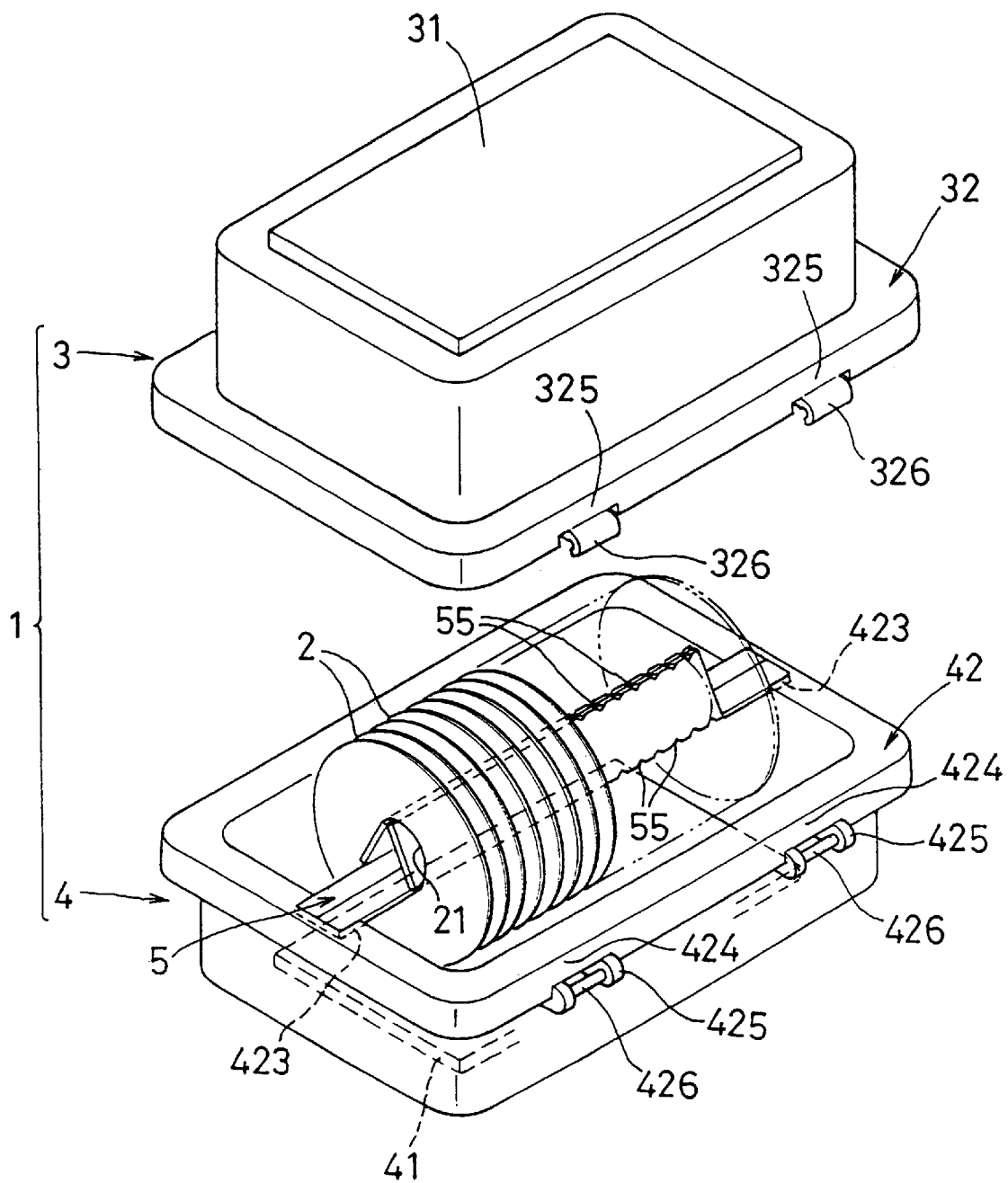
FIG. 12 is a perspective view of a container for memory disks wherein an upper case and a bottom case according to an embodiment other than that of FIG. 1 are separated from each other.
Figure 13:
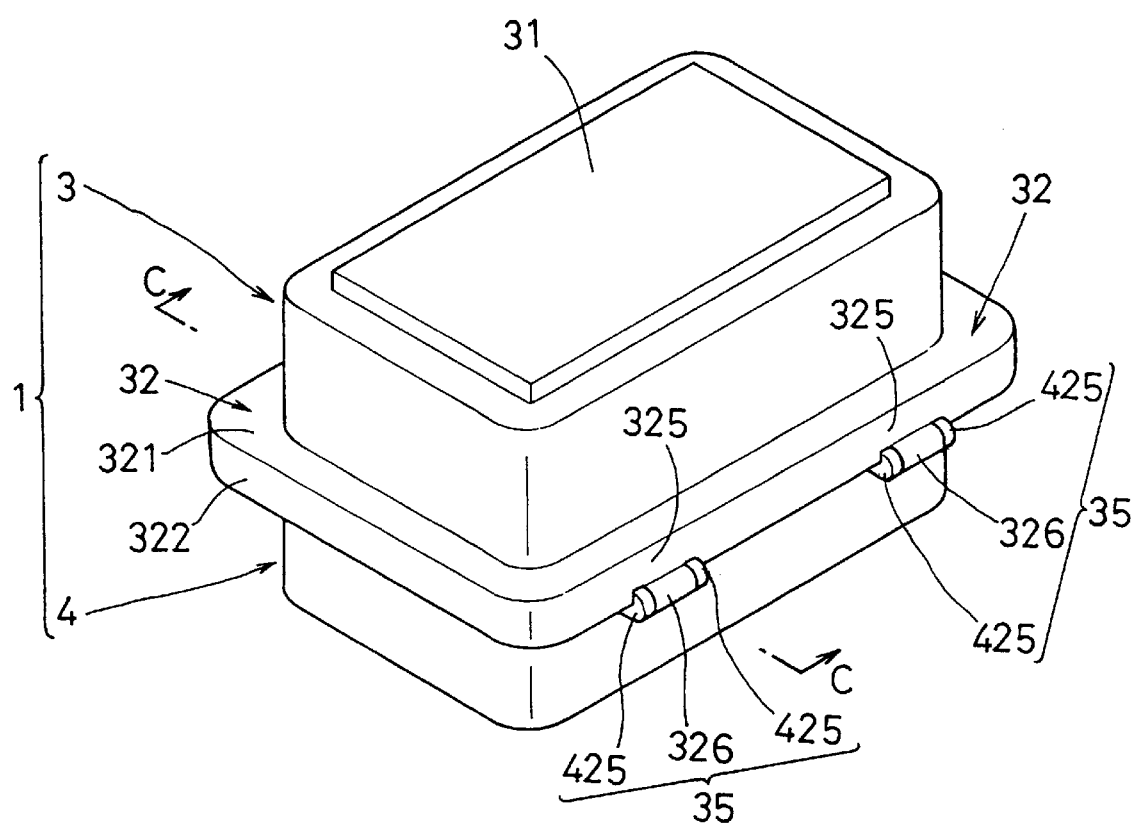
FIG. 13 is a perspective view illustrating a state wherein memory disks are retained in the container of FIG. 12 by making use of the supporting member shown in FIGS. 2 and 3.
Figure 14:
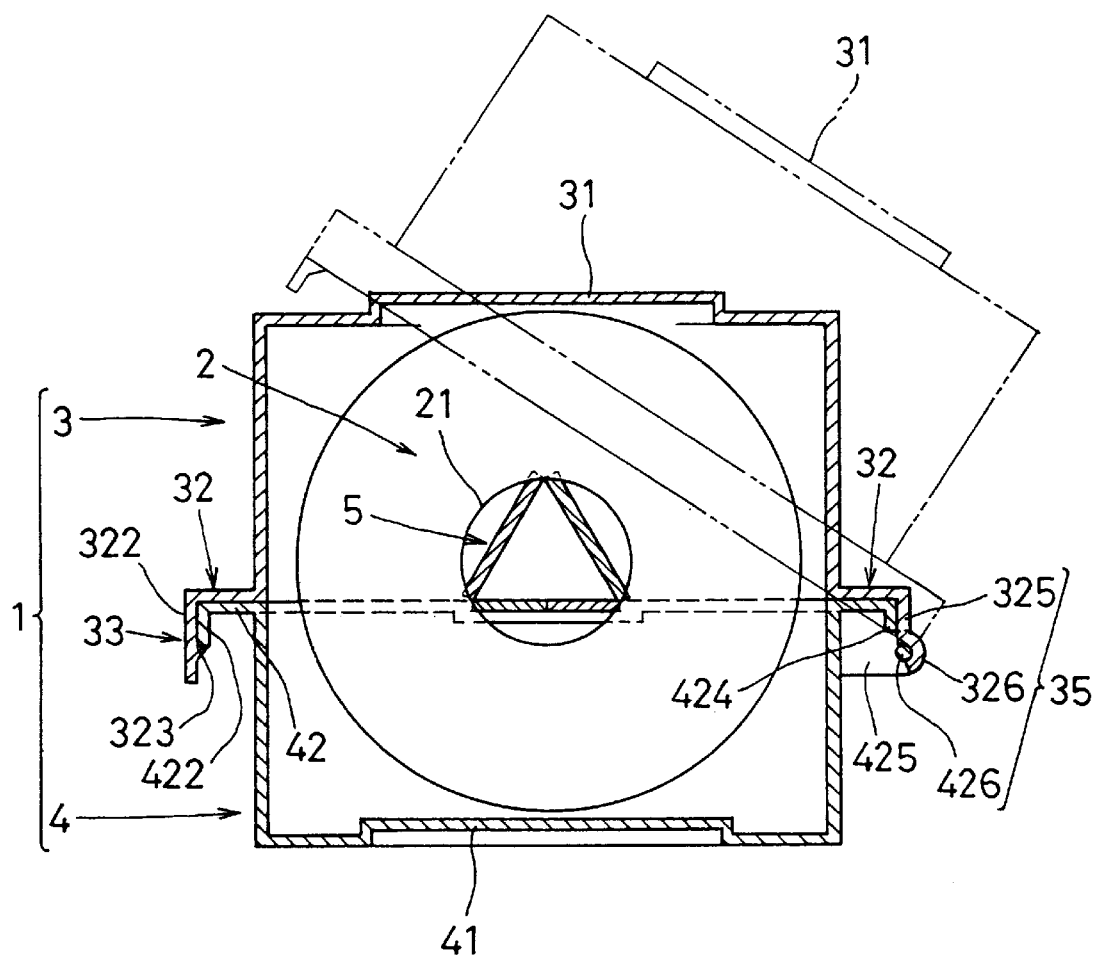
FIG. 14 is a cross-sectional view of a container consisting of an upper case and a bottom case, which is taken along the line C—C of FIG. 13.

For example, the memory disk container of FIG. 1 illustrating one embodiment of the present invention may be constructed as shown in FIGS. 12 to 14, wherein the upper case 3 and the bottom case 4 are interconnected with each other through a hinge mechanism. In this embodiment, FIG. 12 shows a perspective view of the memory disk container 1 wherein the upper case 3 and the bottom case 4 are separated from each other. FIG. 13 shows a perspective view of the memory disk container 1 wherein the upper case 3 and the bottom case 4 are integrally coupled with each other. Although the upper case 3 is rotatably interconnected with the bottom case 4 by means of the hinge mechanism 35, the entire structures other than the provision of the hinge mechanism 35 are almost the same as those of the container shown in FIGS. 1 to 5.

FIG. 14 is a cross-sectional view taken along the line C—C of FIG. 13, wherein the state of the memory disks 2 retained in the container 1 is illustrated.

In this embodiment, the upper case 3 and the bottom case 4 are provided at their one side with a couple of hinge mechanisms 35. Specifically, each hinge mechanism 35 is composed of a semi-circularly curved protrusion 326 formed integral with the suspended portion 325 of the L-shaped rim 32 of the upper case 3, a pair of supporting portions 425 formed integral with the suspended portion 424 of the L-shaped rim 42 of the bottom case 4, and a shaft 426 both ends of which are integrally supported by the supporting portions 425, wherein the curved protrusion 326 is rotatably engaged with the shaft 426.

This upper case 3 is permitted, after the engaging projection 323 is disengaged, to rotate about the shafts 426. Moreover, since the protrusion 326 is semi-circular in cross-sectional shape, the upper case 3 can be removed from the bottom case 4 by moving the upper case 3 toward the hinge mechanisms 35 under the condition where the upper case 3 is inclined as indicated by a two-dot chain line in FIG. 14. When the upper case 3 is opened in this case by rotating the upper case 3 about the hinge mechanisms 35, there is no possibility that the memory disks 2 will be contacted with the upper case 3, thus making it possible to prevent the outer peripheral surface portion of the memory disks 2 from being damaged.

Figure 15:
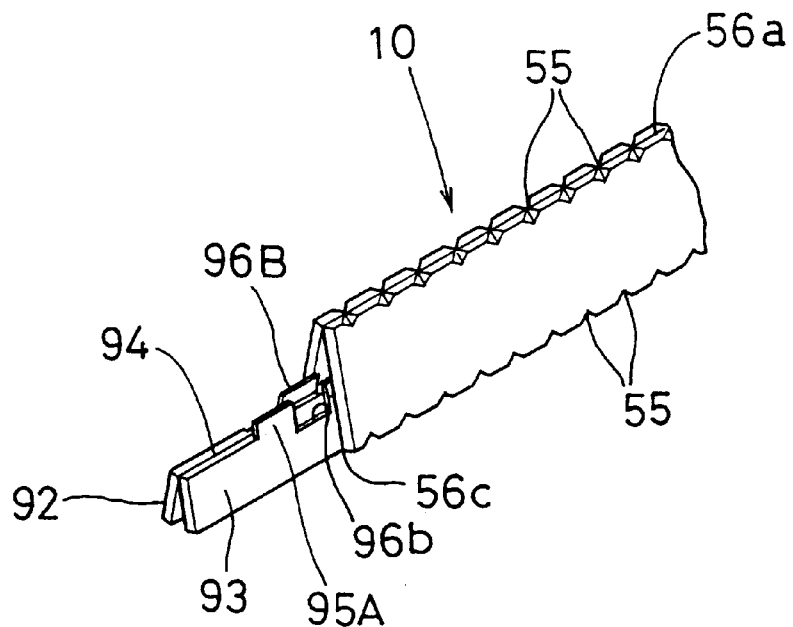
FIG. 15 is a perspective view illustrating a state wherein a supporting member other than that shown in FIG. 1 is collapsed.
Figure 16:
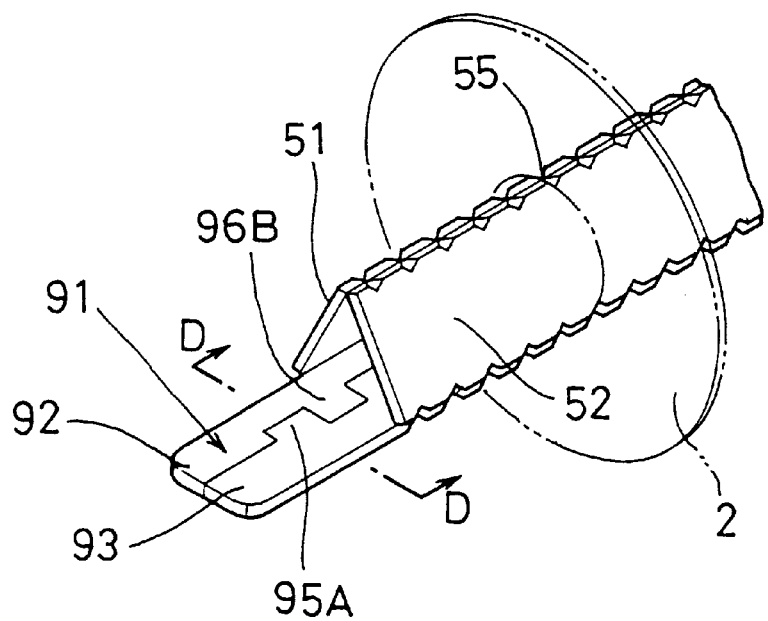
FIG. 16 is a perspective view illustrating a state wherein a memory disk is axially supported by the supporting member shown in FIG. 15.

The elongated strips of the supporting member for memory disks to be used for the memory disk container according to the aforementioned first embodiment shown in FIG. 1 may be constructed as shown in FIGS. 15 to 18, wherein FIG. 15 illustrates a state where the supporting member 10 is collapsed prior to use, while FIG. 16 illustrates a state where the memory disk 2 is axially supported by the supporting member 10 during the use thereof.

The elongated strips 92 and 93 of the supporting member 10 are constructed such that one of the elongated strips, i.e. the elongated strip 92 is provided, on one side edge thereof where the notches 55 for retaining the memory disks are not formed, with recessed portions 95a and projected portions 96B arranged alternately, each having a thickness which is about a half as thick as that of the elongated strip 92, while the other elongated strip 93 is provided likewise, on one side edge thereof, with recessed portions 95A and projected portions 96b which are adapted to be engaged with the recessed portions 95a and projected portions 96B. Other structures of the supporting member 10 are almost the same as those of the supporting member shown in FIGS. 2 and 3.

Figure 17:
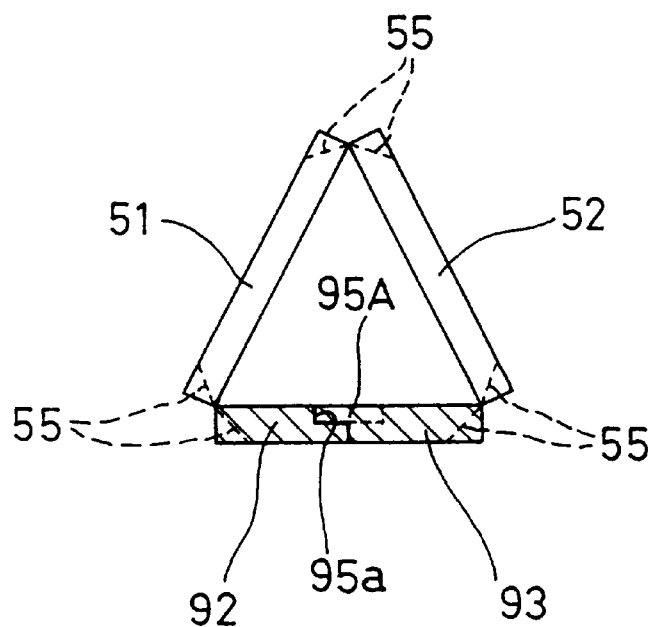
FIG. 17 is a cross-sectional view of a supporting member, which is taken along the line D—D of FIG. 16.
Figure 18:
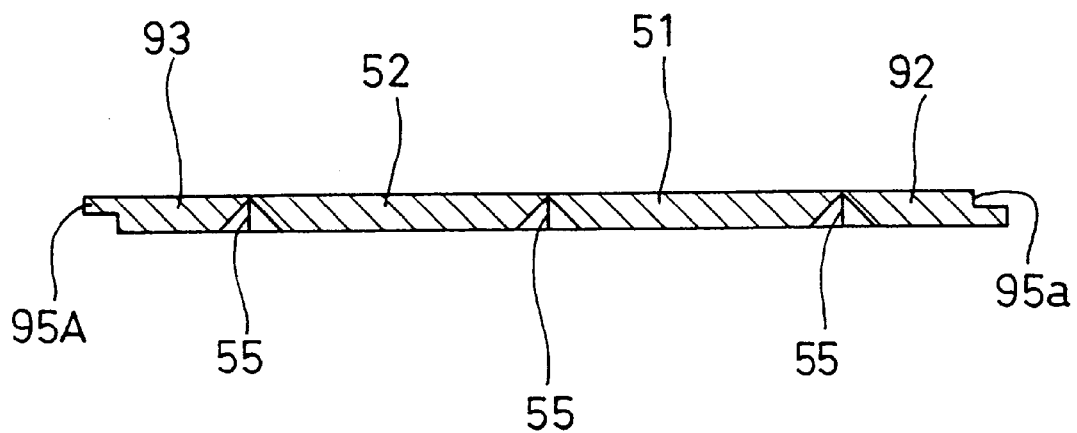
FIG. 18 is a cross-sectional view of a supporting member of FIG. 16, whose linkage is released.

FIG. 17 shows a cross-sectional view, taken along the line D—D of FIG. 16, of the supporting member 10, while FIG. 18 is a cross-sectional view of the supporting member 10 shown in FIG. 17, where the linkage of the supporting member 10 is released.

Since the elongated strip 92 is provided with the recessed portions 95a having a thickness which is about a half as thick as that of the elongated strip 92, and additionally, since the other elongated strip 93 is also provided with the projected portions 95A having a thickness which is about a half as thick as that of the elongated strip 93 so as to allow the recessed portions 95a and the projected portions 95A to be engaged with each other, it is possible to enhance the strength in the longitudinal direction of these elongated strips 92 and 93 as they are engaged with each other through the recessed portions 95a and projected portions 95A. Further, since these elongated strips 92 and 93 are always linearly contacted with each other at the linked portion 94 where the aforementioned recessed portions 95a and projected portions 95A are not formed, it is possible to ensure a sufficient strength in relative to the force in the thickness-wise direction of the strips by applying an adhesive tape to the linked portion 94.

The memory disk container according to the present invention may be constructed as shown in FIGS. 19 to 28 illustrating another embodiment.

Figure 19:
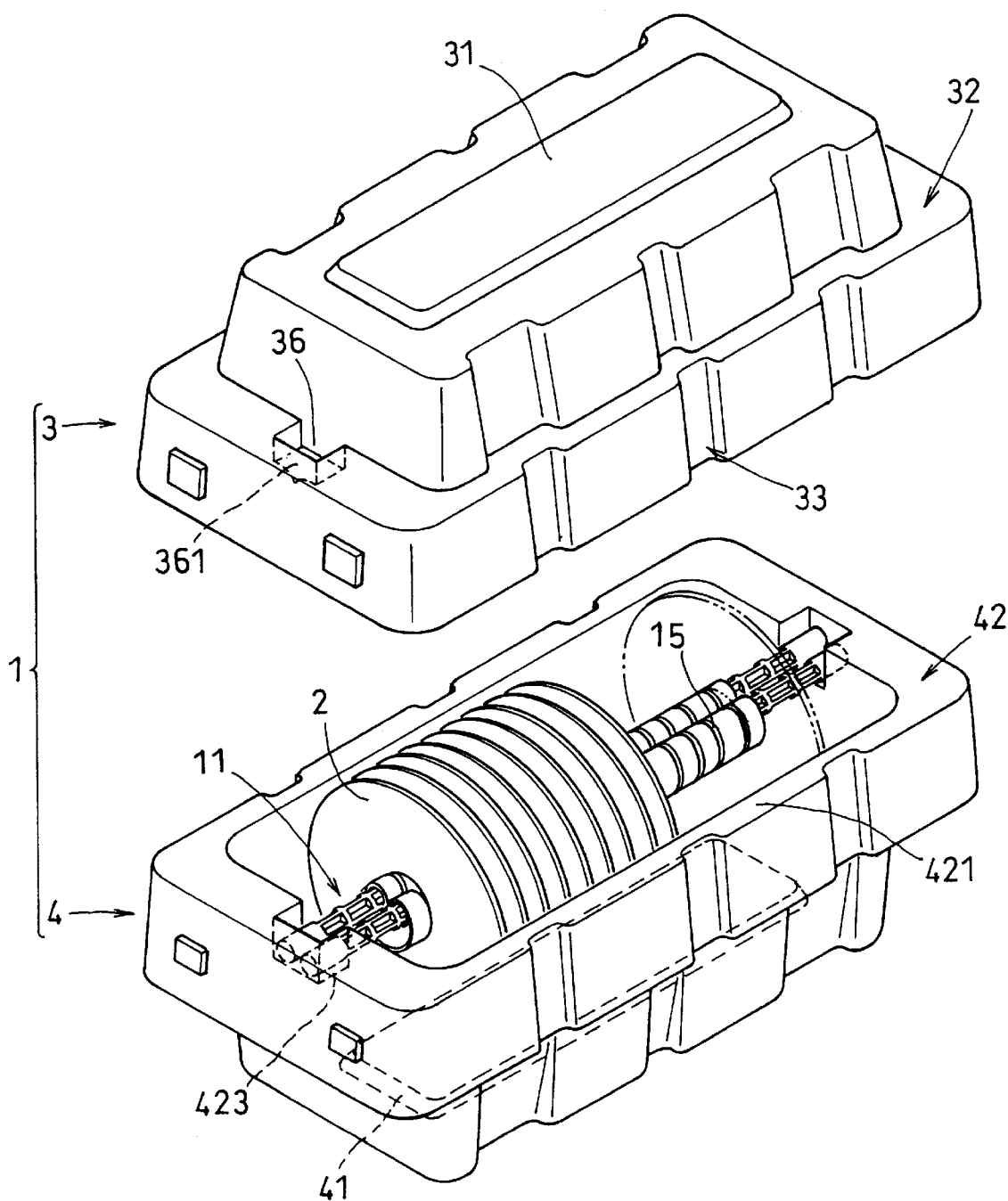
FIG. 19 is a perspective view of a container for memory disks according to a third embodiment of the present invention wherein an upper case and a bottom case are separated from each other.

FIG. 19 shows a perspective view of the memory disk container 1 according to a third embodiment of the present invention wherein the upper case 3 and the bottom case 4 are separated from each other, the structures of which are almost the same as those shown in FIGS. 1 to 5.

The upper case 3 is provided with the raised flat portion 31, and with the L-shaped rim 32 having engaging portions 33. On the other hand, the bottom case 4 is provided the raised flat bottom surface 41 and with the L-shaped rim 42 having a pair of recessed portions 423 each formed at the center of the opposite shorter sides.

The supporting member 11 consisting of a pair of rods 12 and 13 and a sheet 14 is placed and supported on the recessed portions 423 of the bottom case 4. This supporting member 11 is designed to be introduced into the central holes 21 of a large number of memory disks 2 so as to retain the memory disks 2 by fitting each memory disk 2 in each of a large number of linear grooves 15 formed in the sheet 14.

Figure 20:
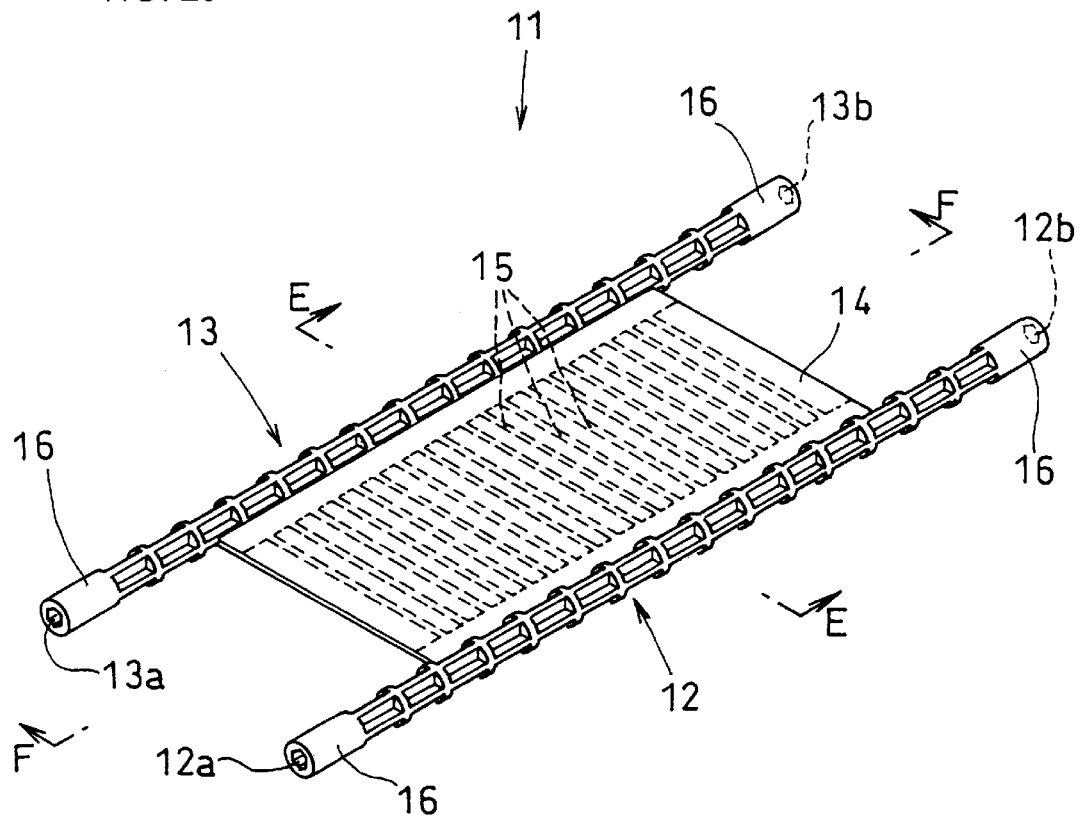
FIG. 20 is a perspective view of a supporting member of FIG. 19 before the supporting member is mounted in the container.
Figure 21A:
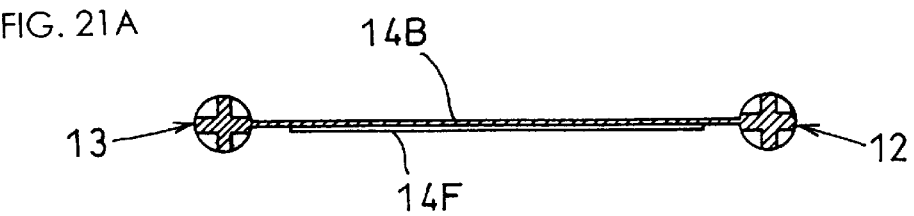
FIG. 21(a) is a cross-sectional view of a supporting member, which is taken along the line E—E of FIG. 20.
Figure 21B:
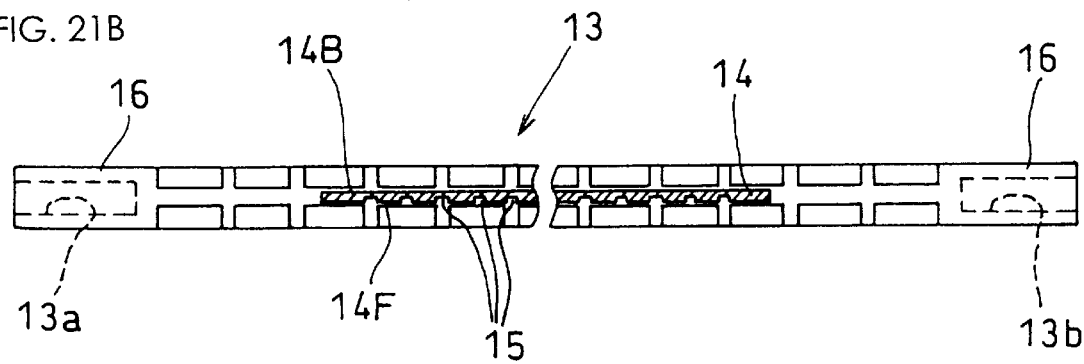
FIG. 21(b) is a cross-sectional view of a supporting member, which is taken along the line F—F of FIG. 20.
Figure 22:
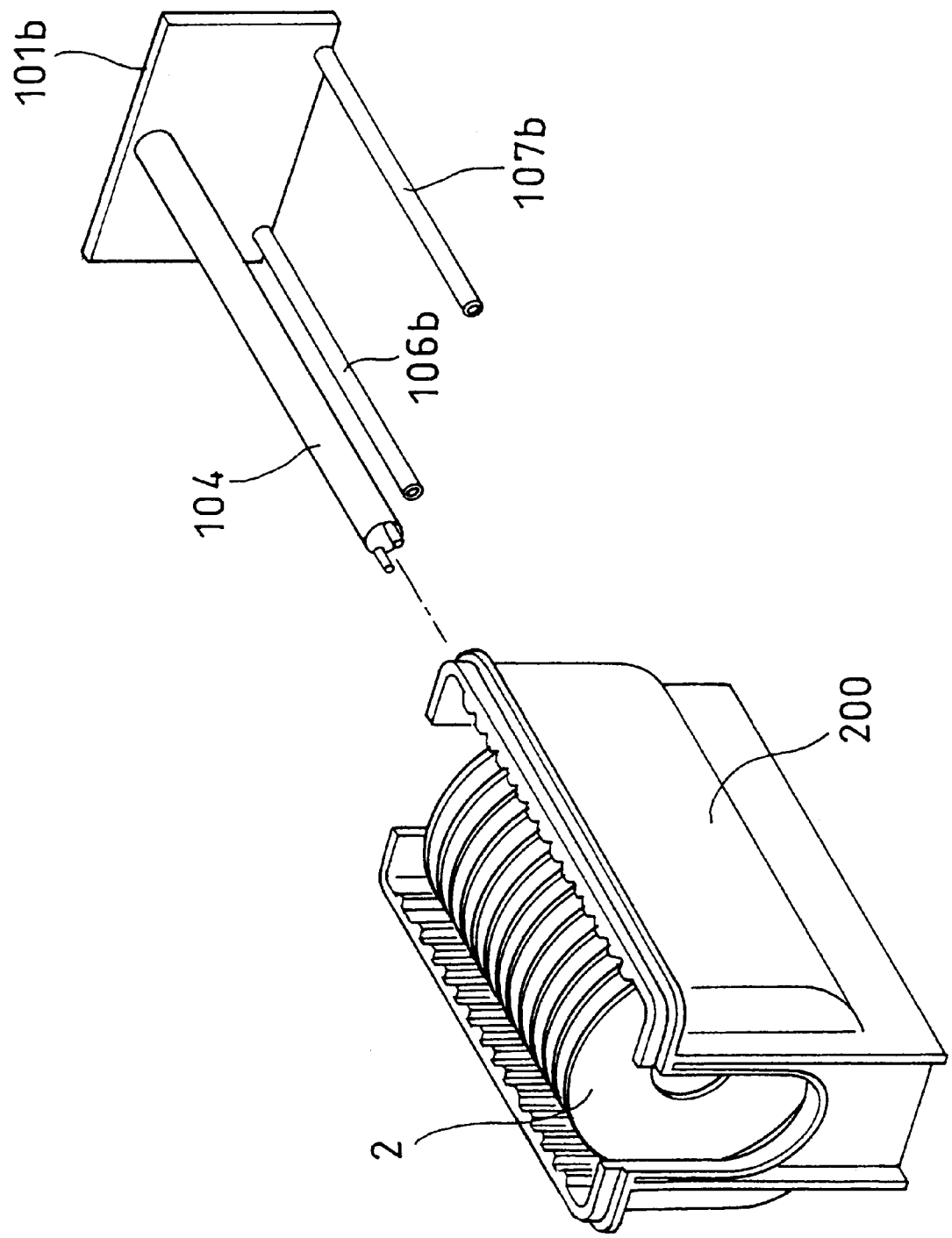
FIG. 22 is a perspective view illustrating the position of the memory disks in relative to the winding apparatus.
Figure 23:
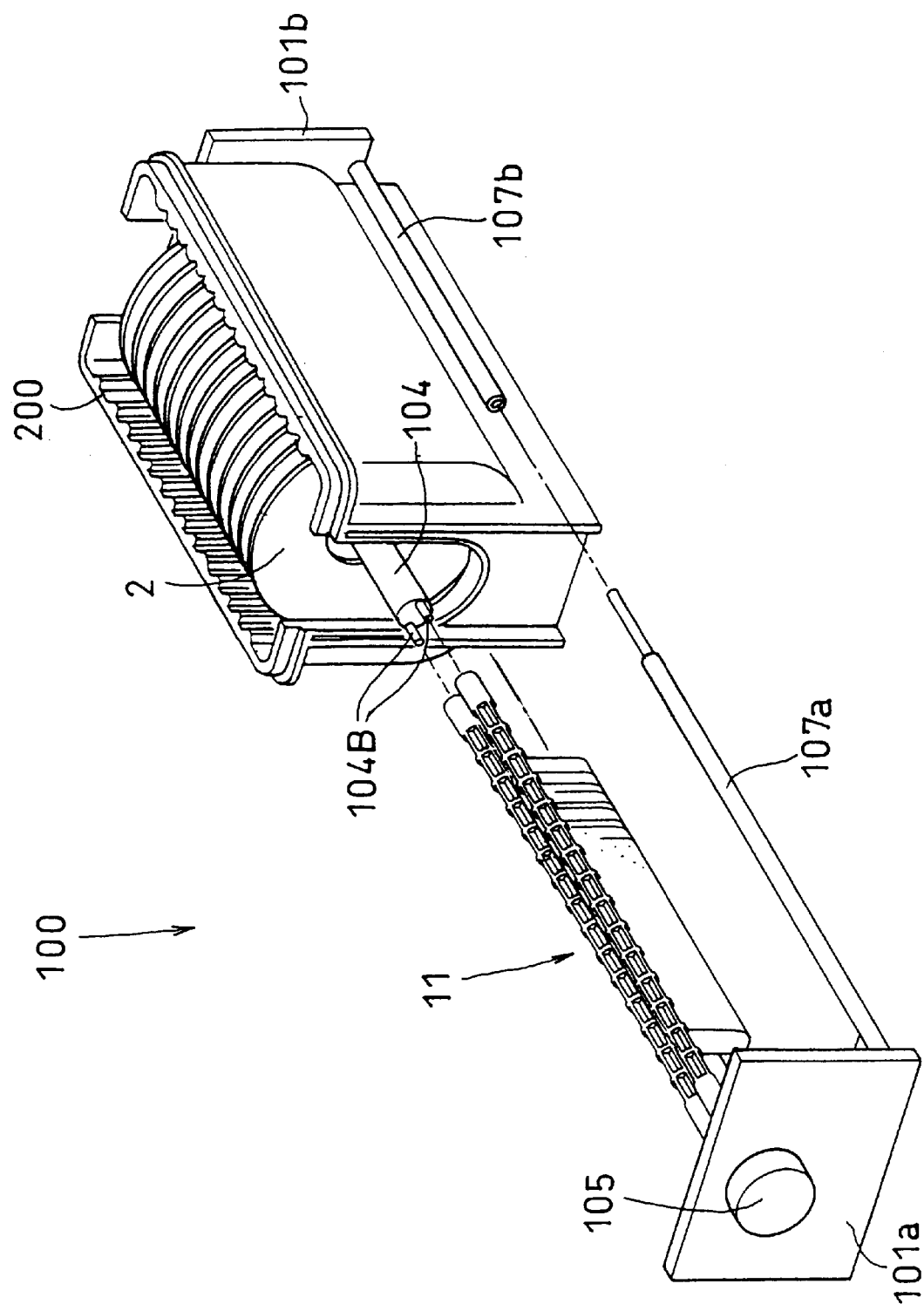
FIG. 23 is a perspective view illustrating the position of the memory disks in relative to the winding apparatus and to the supporting member.
Figure 24:
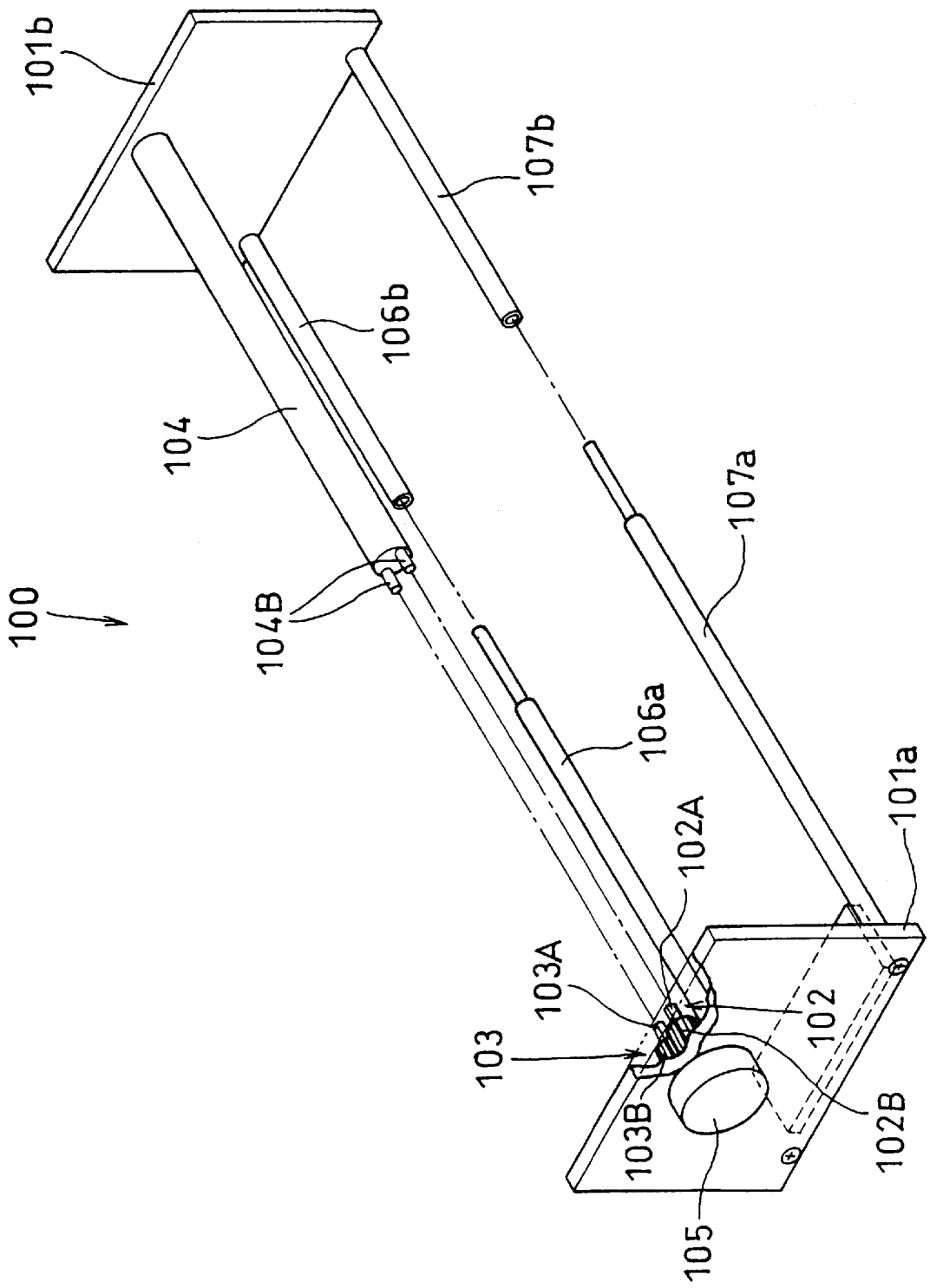
FIG. 24 is a perspective view illustrating the winding apparatus shown in FIGS. 22 and 23.
Figure 25:
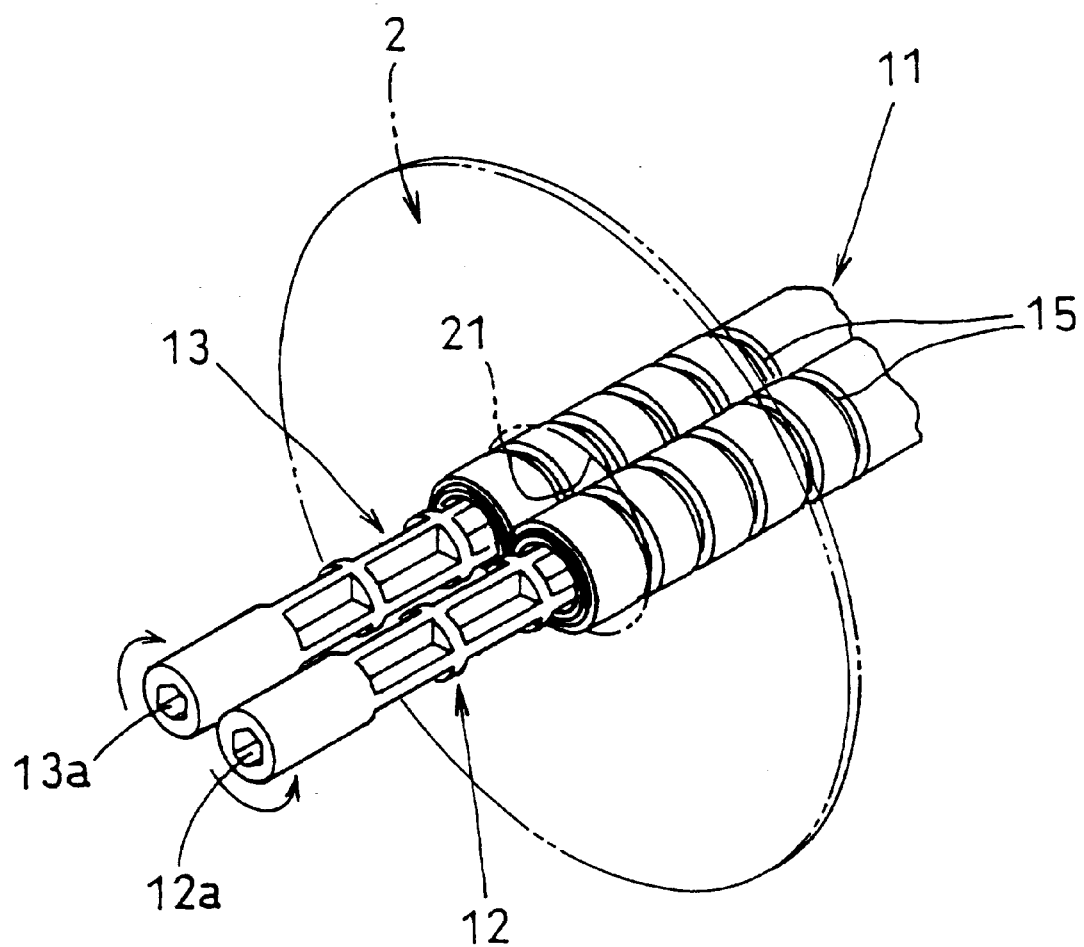
FIG. 25 is a perspective view of the supporting member of FIG. 19 before the memory disks are axially supported on the supporting member.
Figure 26:
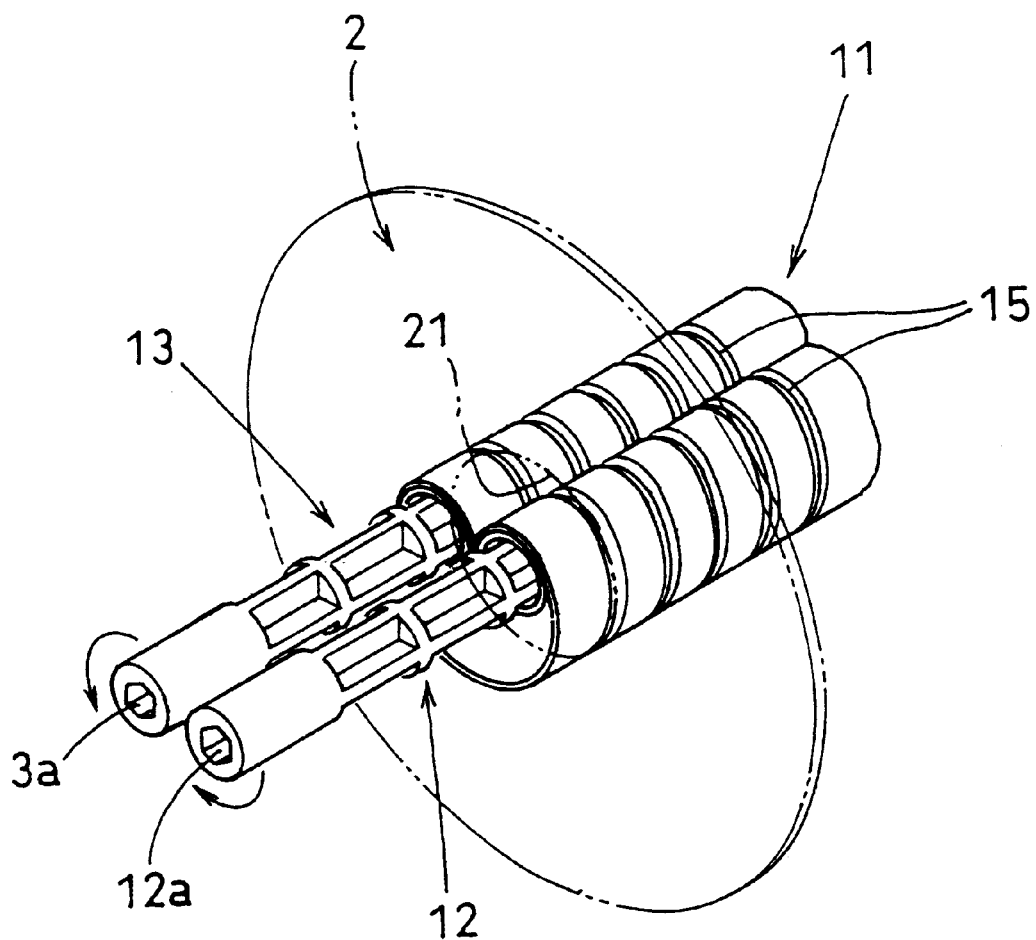
FIG. 26 is a perspective view of the supporting member of FIG. 19 on which the memory disks are axially supported.

FIGS. 20 to 26 illustrate in detail the structure of the supporting member 11 shown in FIG. 19. Namely, FIG. 20 shows a state of the supporting member 11 before the supporting member 11 is introduced to mount the memory disks 2 thereon. FIG. 21(a) shows a cross-sectional view, taken along the line E—E of FIG. 20, of the supporting member 11. FIG. 21(b) shows a cross-sectional view, taken along the line F—F of FIG. 20, of the supporting member 11. FIG. 22 illustrates the position of the memory disks 2 in relative to the winding apparatus 100. FIG. 23 illustrates the position of the memory disks 2 in relative to the supporting member 11. FIG. 24 illustrates the winding apparatus 100. FIG. 25 shows a state of the supporting member 11 before the memory disks 2 are axially supported on the supporting member 11. FIG. 26 shows a state of the supporting member 11 on which the memory disks 2 are axially supported.

To illustrate in detail the structure of the supporting member 11 by referring to FIGS. 20 and 21, the supporting member 11 comprises a couple of plastic rods 12 and 13, and a sheet of plastic sheet 14, wherein the rods 12 and 13 are coupled integrally, through one side thereof, with the opposite sides of the sheet 14.

The sheet 14 is provided with a large number of linear grooves 15 for retaining a large number of the memory disks, each linear groove 15 extending in the direction orthogonal to the longitudinal direction of the rods 12 and 13. These linear grooves 15 are formed to have a depth which corresponds to about a half of thickness of the sheet 14 and is directed from the top surface 14F to the back surface 14B of the sheet 14 (see FIG. 21).

These rods 12 and 13 are formed to have the same diameter and the same length with each other, and are integrally connected, at the central region (in the longitudinal direction) thereof, with the opposite end portions of the sheet 14. Specifically, the longitudinal direction of these rods 12 and 13 is orientated orthogonal to the direction of the linear grooves 15. Additionally, the protruded opposite end portions 16 of these rods 12 and 13 are provided with hexagonal bottomed holes 12a and 12b, and 13a and 13b, respectively. By the way, these rods 12 and 13 are configured to have a cross-shaped section for the purpose of preventing the generation of sink in the press working.

The supporting member 11 constructed as mentioned above is designed to hold the memory disks 2 by making use of the winding apparatus 100 shown in FIGS. 22 to 24. Namely, this winding apparatus 100 is composed of a set of supporting plates 101a and 101b, a couple of plug-in shafts 102 and 103 having gear wheels 102B and 103B respectively and being attached to the supporting plate 101a, an induction arm 104, a winding knob 105 which is adapted to be engaged with either one of the plug-in shafts 102 and 103, and a pair of guiding rods 106 and 107.

The induction arm 104 is provided, at the distal end thereof, with a pair of engaging protrusions 104B, and is formed of a solid round bar having a diameter smaller than that of the central hole 21 of the memory disk 2. This induction arm 104 is axially supported by the supporting plate 101b. The pair of engaging protrusions 104B are adapted to be engaged with the bottomed holes 12a and 12b of the rods 12 and 13, respectively.

In this case, the memory disks 2 are axially supported by the supporting member 11 as follows. First of all, the memory disks 2 are positioned in the disk case 200, and the induction arm 104 of the supporting plate 101b is introduced into the central hole 21 of the memory disks 2. At this occasion, the induction arm 104 is guided as the guiding rods 106 and 107 are contacted with the longitudinal sidewall of the disk case 200, so that the induction arm 104 can be inserted from the shorter side of the disk case 200 into the central hole 21 of the memory disk 2 without this induction arm 104 being contacted with the central hole 21 (see FIGS. 22 and 23).

The supporting member 11 is disposed in such a manner that the top surface 14F of the sheet 14, i.e. the linear grooves 15 for retaining the memory disks are directed downward, and is fittingly secured, by way of the bottomed holes 12a and 13a formed at one end of the supporting member 11, to the engaging protrusions 102A and 103A of the plug-in shafts 102 and 103 which are axially supported by the supporting plate 101a of the winding apparatus 100.

The other end of the supporting member 11 is fixed in place by introducing a pair of the engaging protrusions 104B of the induction arm 104, which have been passed through the central holes 21 of the memory disks 2 and protruded out of the shorter side of the disk case 200, into the bottomed holes 12b and 13b. The guiding rods 106a and 106b, and 107a and 107b are mutually engaged with each other at the occasion of engaging the supporting member 11 with the induction arm 104.

When the winding knob 105 is rotated in the direction as indicated by the arrow in FIG. 25 so as to render the top surface 14F to be disposed on the outer side of the rods 12 and 13, i.e. so as to render the linear grooves 15 to appear on the outer side of the rods 12 and 13, the rods 12 and 13 are caused to rotate via the gear wheels 102B and 103B, thus rendering the sheet 14 to be wound up by the rods 12 and 13. As a result, the outer circumferential surfaces of the rods 12 and 13 are covered with the sheet 14, and at the same time, the linear grooves 15 are disposed in the direction orthogonal to the longitudinal direction of the rods 12 and 13. This supporting member 11 as constructed as mentioned above is manipulated such that the rods 12 and 13 are continued to rotate so as to wind up the sheet 14 until the diameter thereof is sufficiently reduced to allow the supporting member 11 to be easily introduced into the central hole 21 of the memory disks 2 (see FIG. 25).

FIG. 26 shows a state where the supporting member 11 of FIG. 25 is engaged with the memory disks 2. In this case, the supporting member 11 is guided by the guiding rods 106 and 107 and introduced, in a state where the sheet 14 is wound up by the rods 12 and 13, into the central hole 21 of the memory disks 2 in such a manner as to align the memory disks 2 with the linear grooves 15. Then, the rods 12 and 13 are rotated in the direction opposite to the aforementioned winding direction of the sheet 14 as indicated by an arrow shown in FIG. 26. As a result, the linear grooves 15 are caused to move from the central hole 21 of the memory disk 2 toward the outer periphery of the memory disk 2, and to engage with the peripheral portion of the central hole 21, thus making it possible to securely retain the memory disks 2.

Figure 27:
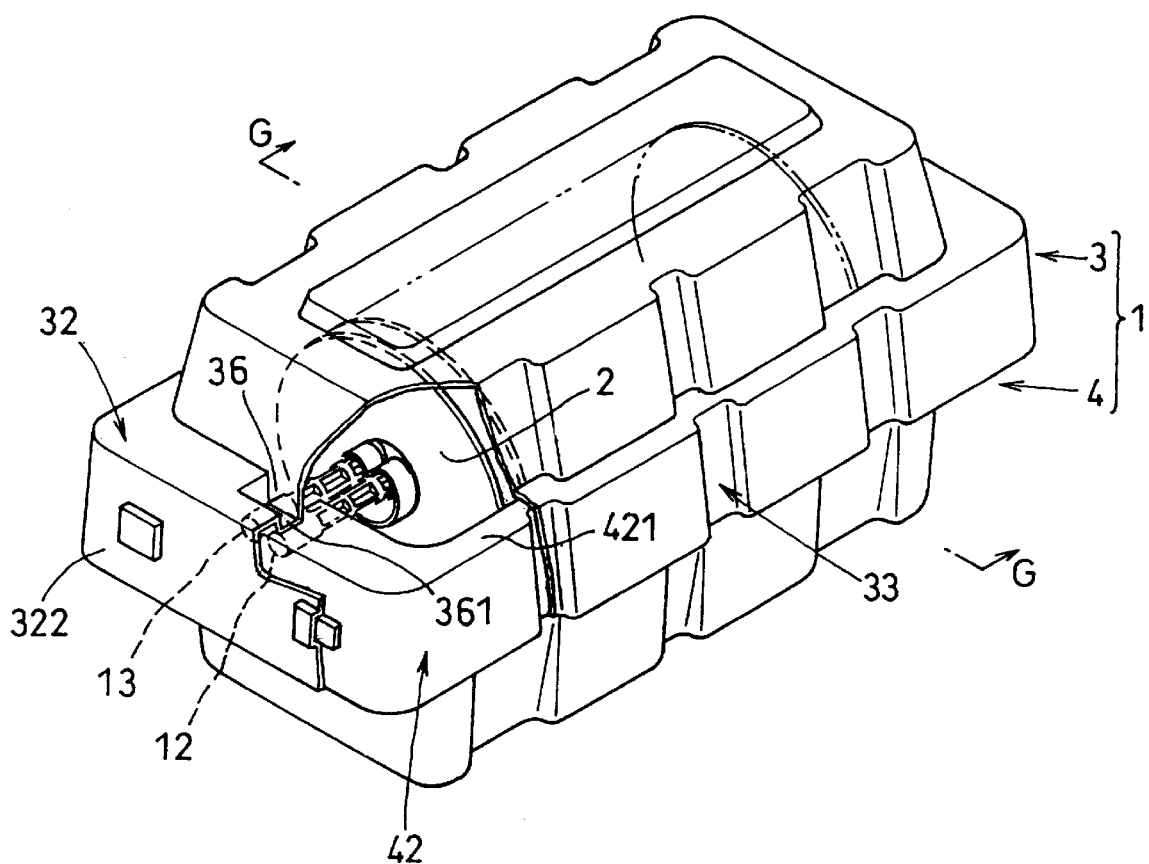
FIG. 27 is a perspective view illustrating a state wherein memory disks are retained in the container of FIG. 19 by making use of the supporting member shown in FIGS. 20 to 26.

FIG. 27 shows a perspective view illustrating a state wherein memory disks 2 are retained in the container of FIG. 19 by making use of the supporting member shown in FIGS. 20 to 26.

At first, the supporting member 11 is expanded in the central holes 21 of the memory disks 2 thereby to securely retain the memory disks 2. Then, after the opposite protruded portions 16 of the rods 12 and 13 have been removed from the winding apparatus 100, the rods 12 and 13 of the supporting member 11 are fitted in the recessed portions 423 formed on the top surface 421 of the L-shaped rim 42 of the bottom case 4, whereby the supporting member 5 is set in place in the bottom case 4 while the outer peripheries of the memory disks 2 are kept prevented from being contacted with the inner surface of the bottom case 4.

Then, the bottom case 4 is closed with the upper case 3, thereby permitting the suspended portion 422 of the L-shaped rim 42 of the bottom case 4 to be engaged with the engaging portions 33 of the L-shaped rim 32 of the upper case 3. As a result, the L-shaped rim 42 of the bottom case 4 is closely contacted with the L-shaped rim 32 of the upper case 3, and at the same time, the inner pressing surfaces 361 of the couple of the pressing recessed portions 36 formed respectively at the opposite central portions of the shorter sides of the upper case 3 are acted to press the rods 12 and 13 of the supporting member 11, thereby making it possible to tightly pack the memory disks 2 while preventing the outer peripheries of the memory disks 2 from being contacted with the inner surface of the upper case 3.

Due to the effect of this tight closing between the bottom case 4 and the upper case 3, the pressing force by the inner pressing surfaces 361 of the pressing recessed portions 36 formed on the sides of the upper case 3 is acted on the rods 12 and 13 of the supporting member 11, thereby preventing the rods 12 and 13 from being dismounted from the recessed portions 423 of the L-shaped rim 42 of the bottom case 4. Thus, the rods 12 and 13 of the supporting member 11 can be stably kept fitted in the recessed portions 423 of the L-shaped rim 42.

Figure 28:
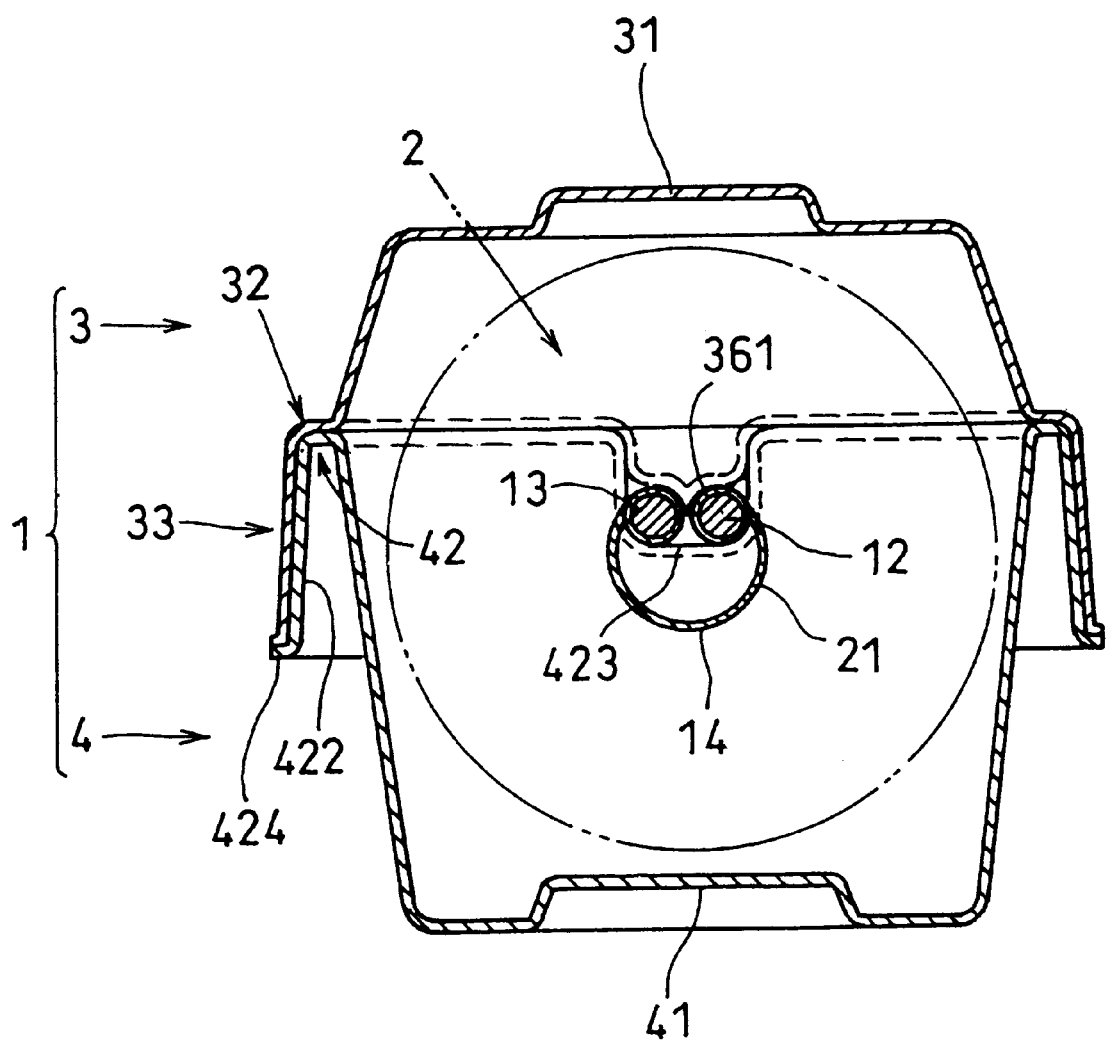
FIG. 28 is a cross-sectional view of a container consisting of an upper case and a bottom case, which is taken along the line G—G of FIG. 27.
Figure 29:
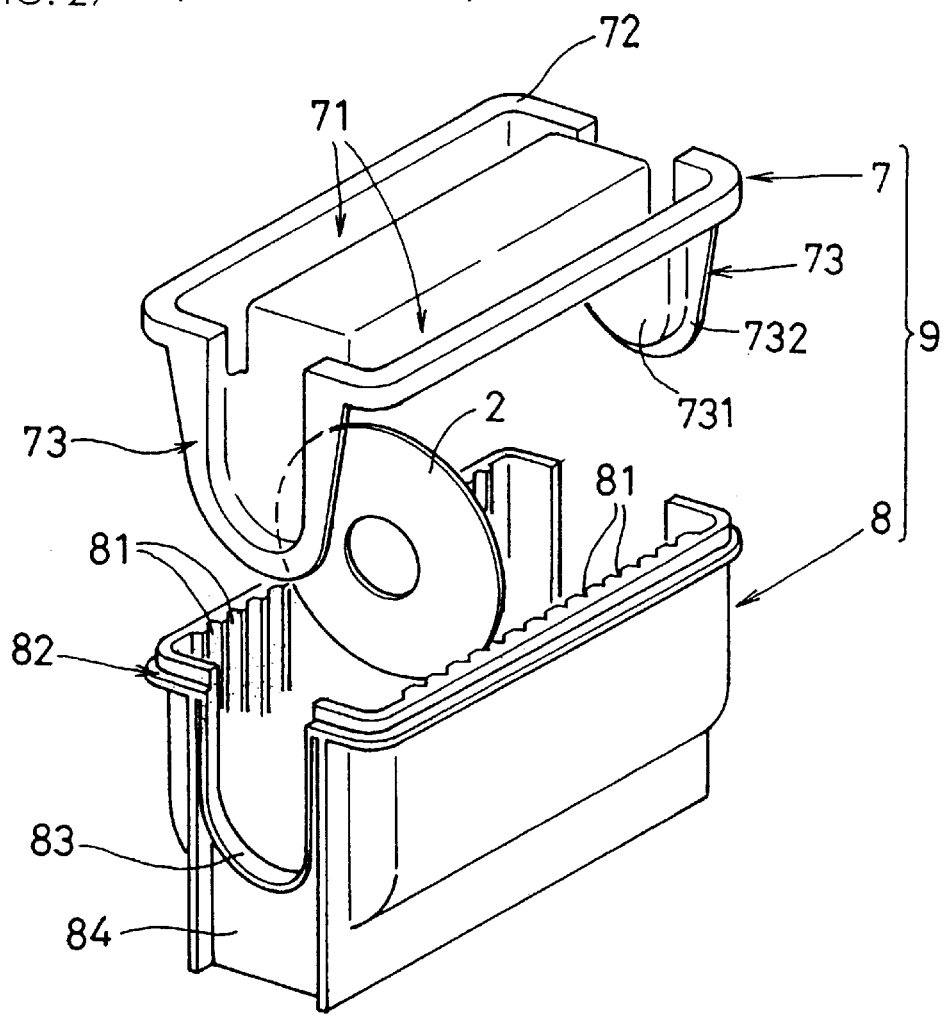
FIG. 29 is a perspective view of a container for memory disks according to a prior art wherein an upper case and a bottom case are separated from each other.
Figure 30:
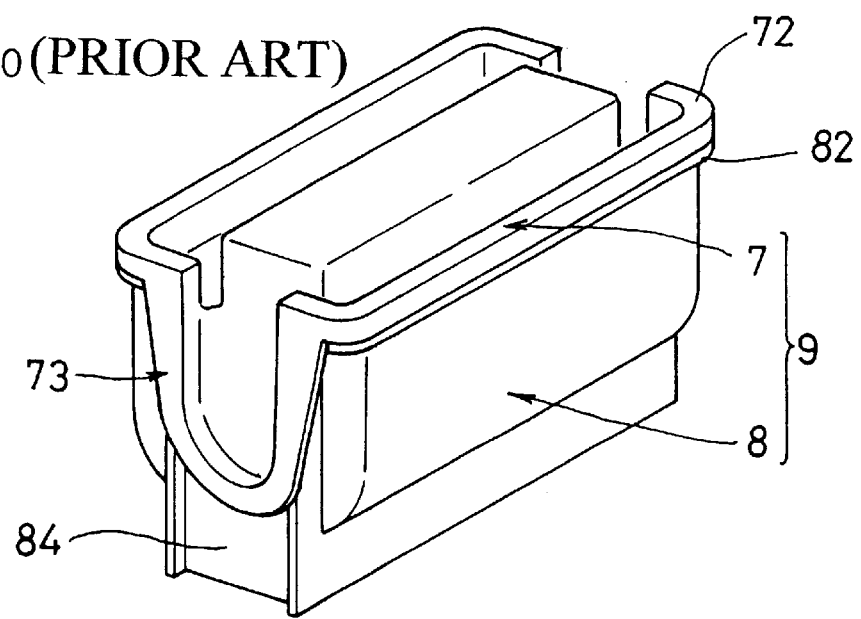
FIG. 30 is a perspective view of a container in which memory disks are retained between the upper case and the bottom case shown in FIG. 29.

FIG. 28 illustrates a cross-sectional view, taken along the line G—G of FIG. 27, of the container consisting of the upper case 3 and the bottom case 4. Namely, FIG. 28 illustrates a state of the memory disks 2 as they are being mounted in the container 1. An engaging projection 424 is formed at each suspended portion 422 of the L-shaped rim 42 of the bottom case 4. The upper case 3 and the bottom case 4 of the container 1 are coupled with each other in a tightly sealed condition by means of the suspended portion 422. Further, the inflated flat portion 31 is formed on the top portion of the upper case 3, and the swelled-up flat bottom surface 41 is formed on the bottom of the bottom case 4, so that a plurality of the containers 1 can be piled up one after another while the outer peripheries of the memory disks 2 supported axially by the supporting member 11 are prevented from being contacted with the inner surfaces of the upper and bottom cases 3 and 4.

By the way, according to the foregoing embodiments, the upper case 3, the bottom case 4 and the supporting member 5, etc. are illustrated as being made of a transparent plastic material. However, it is possible to employ any other suitable materials for the manufacture of these components.

As seen from the foregoing explanations, the memory disk container according to the present invention is constructed such that the memory disk can be securely retained by taking advantages of the central hole of the memory disk. As a result, it is possible to prevent the outer peripheral portion of a memory disk having a large memory capacity from being damaged during the transportation thereof. Moreover, since the supporting member for the memory disks is made collapsible or rotatable, and is provided at the outer peripheral, portion thereof with recessed or projected portions for positioning, the handling of the supporting member can be greatly facilitated.

What is claimed is:

1. A container for memory disks comprising:

an upper case;

a bottom case; and a supporting member adapted to be held between said upper case and said bottom case and to be inserted into a central hole of each said memory disk so as to retain said memory disks between said cases thereby rendering outer peripheral portions of said memory disks suspended in said container;

wherein said upper case includes a pressing surface for pressing the supporting member, and the bottom case includes a recessed portion for allowing the supporting member to be fitted therein, thereby allowing the supporting member to be retained between the recessed portion and the pressing surface.

2. The container for memory disks according to claim 1, wherein said upper case includes, at a top portion thereof, a raised flat portion, and said bottom case is provided with a raised flat bottom surface.

3. The container for memory disks according to claim 1, wherein said upper case and bottom case are respectively provided with a hinge mechanism, whereby these upper case and bottom case are made rotatable in relative to each other.

4. A container for memory disks comprising:

an upper case;

a bottom case; and a supporting member adapted to be held between said upper case and said bottom case and to be inserted into a central hole of each said memory disk so as to retain said memory disks between said cases thereby rendering outer peripheral portions of said memory disks to become free in said container;

a pair of wide short strips each having notched sides for retaining the memory disks; and a pair of narrow long strips each having a notched side for retaining the memory disks;

wherein said pair of narrow long strips are enabled to be folded into a space between said pair of wide short strips.

5. The supporting member for the memory disks according to claim 4, wherein said pair of narrow long strips are made engageable with each other through the sides located opposite to said notched sides.

* * * * *